US010939262B2

(12) United States Patent
Mosenia et al.

(10) Patent No.: US 10,939,262 B2
(45) Date of Patent: Mar. 2, 2021

(54) SYSTEM AND METHOD FOR BRINGING PROGRAMMABILITY AND CONNECTIVITY INTO ISOLATED VEHICLES

(71) Applicant: The Trustees of Princeton University, Princeton, NJ (US)

(72) Inventors: Arsalan Mosenia, Princeton, NJ (US); Jad F. Bechara, Princeton, NJ (US); Prateek Mittal, Princeton, NJ (US); Mung Chiang, Carmel, IN (US); Tao Zhang, Fort Lee, NJ (US)

(73) Assignee: THE TRUSTEES OF PRINCETON UNIVERSITY, Princeton, NJ (US)

(*) Notice: Subject to any disclaimer, the term of this patent is extended or adjusted under 35 U.S.C. 154(b) by 55 days.

(21) Appl. No.: 16/290,019

(22) Filed: Mar. 1, 2019

(65) Prior Publication Data

US 2019/0274018 A1 Sep. 5, 2019

Related U.S. Application Data

(60) Provisional application No. 62/637,099, filed on Mar. 1, 2018, provisional application No. 62/736,515, filed on Sep. 26, 2018.

(51) Int. Cl.
*H04W 4/48* (2018.01)
*G06F 8/70* (2018.01)
*G06F 9/445* (2018.01)
*G06F 8/65* (2018.01)

(52) U.S. Cl.
CPC ............... *H04W 4/48* (2018.02); *G06F 8/65* (2013.01); *G06F 8/70* (2013.01); *G06F 9/44526* (2013.01)

(58) Field of Classification Search
CPC .. H04W 4/80; H04W 4/48; G06F 8/65; G06F 8/70; G06F 9/44526
USPC .................................................. 717/120, 170
See application file for complete search history.

(56) References Cited

U.S. PATENT DOCUMENTS

| 8,751,065 | B1 * | 6/2014 | Kato | H04M 1/72533 |
| | | | | 340/426.13 |
| 8,897,952 | B1 * | 11/2014 | Palmer | G07C 5/008 |
| | | | | 701/31.5 |
| 9,171,456 | B2 * | 10/2015 | Ramchandani | G07C 9/00857 |
| 2016/0098876 | A1 * | 4/2016 | Oz | H04W 4/023 |
| | | | | 340/5.61 |

(Continued)

OTHER PUBLICATIONS

Hassan Abid et al. "V-Cloud: Vehicular Cyber-Physical Systems and Cloud Computing", In ISABEL 2011, Oct. 26-29, Barcelona, Spain.

(Continued)

*Primary Examiner* — Marina Lee
(74) *Attorney, Agent, or Firm* — Meagher Emanuel Laks Goldberg & Liao, LLP

(57) ABSTRACT

According to various embodiments, a system for vehicular application development is disclosed. The system includes a programmable on-board diagnostics (OBD)-connected dongle for providing computational and storage resources to a vehicle and hosting one or more applications in the vehicle. The dongle is configured to utilize one or more external devices, cloud servers, and add-on modules to provide additional resources for the applications and enable control of the applications. The dongle is implemented with a middleware that enables intended operations of the dongle.

20 Claims, 10 Drawing Sheets

(56) References Cited

U.S. PATENT DOCUMENTS

2017/0058811 A1* 3/2017 Misson ............... F02D 41/2487
2018/0075380 A1* 3/2018 Perl ......................... G06Q 50/30
2019/0274018 A1* 9/2019 Mosenia ............. G06F 9/44526

OTHER PUBLICATIONS

Xiping Hu et al. "Social Drive: A Crowdsourcing-based Vehicular Social Networking System for Green Transportation", In DIVANet 2013, Nov. 3-8, Barcelona, Spain.

Zhanlin Ji et al. "A Cloud-Based Car Parking Middleware for IoT-Based Smart Cities: Design and Implementation", In Sensors 2014, 14, 22372-22393; doi: 10.3390/s141222372.

Euisin Lee et al. "Vehicular Cloud Networking: Architecture and Design Principles", In IEEE Communications Magazine, Feb. 2014, pp. 148-155.

Q. Li , T. Zhang & Y. Yu (2011) "Using cloud computing to process intensive floating car data for urban traffic surveillance, International Journal of Geographical Information", Science, 25:8, 1303-1322, DOI: 10.1080/13658816.2011.577746.

Javier E. Meseguer et al. "DrivingStyles: a smartphone application to assess driver behavior", In IEEE Symposium on Computers and Communications (ISCC), 2013.

Arsalan Mosenia et al. "ProCMotive: Bringing Programability and Connectivity into Isolated Vehicles", In Proceedings of the ACM on Interactive, Mobile, Wearable and Ubiquitous Technologies, vol. 1, No. 1, Article 1, Mar. 2018.

Carmela Troncoso et al. "PriPAYD: Privacy-Friendly Pay-As-You-Drive Insurance", in IEEE Transactions on dependable and secure computing, vol. 8, No. 5, 2011.

Jiafu Wan et al. "Context-Aware Vehicular Cyber-Physical Systems with Cloud Support: Architecture, Challenges, and Solutions", In IEEE Communications Magazine, vol. 52, Issue 8, pp. 106-113, Aug. 2014.

Zhang et al.: "Defending Connected Vehicles Against Malware: Challenges and a Solution Framework", In IEEE Internet of Things Journal, vol. 1, No. 1, Feb. 2014.

\* cited by examiner

| Step | Description |
|---|---|
| 1. Plate Detection | Finds Potential License Plate Regions |
| 2. Binarization | Converts the Plate Image into Black and White |
| 3. Char Analysis | Finds Character-Sized "Blobs" in the Plate Region |
| 4. Plate Edges | Finds the Edges/Shape of the Plate |
| 5. Deskew | Transforms the Perspective to a Straight-On View |
| 6. Segmentation | Isolates and Cleans Up the Characters |
| 7. Char Recognition | Analyzes Each Character Image |
| 8. Post Process | Creates a Top N List of Play Possibilities |

*FIG. 4*

| Resolution | Cloud-Based | SmartCore-Based | Hybrid |
|---|---|---|---|
| 1080p | 6.8 | 8.0 | 11.88 |
| 720p | 4.4 | 5.7 | 5.57 |

*FIG. 6*

| Implementation | DTR |
|---|---|
| Cloud-Based | 3.6 |
| SmartCore-Based | 3.0 |
| Hybrid | 4.3 |

*FIG. 7*

| Implementation | Cellular Data Usage (MB) |
|---|---|
| Cloud-Based | 115.0 |
| SmartCore-Based | 0.0 |
| Hybrid | 3.3 |

*FIG. 8*

| Applications | Privacy | Security | Performance | Cellular Data Usage | Resiliency Against Connection Unavailability |
|---|---|---|---|---|---|
| Amber Res. (SmartCore) | ↑↑ | N/A | Similar at 1FPS | ↓↓ | ↑↑ |
| Amber Res. (Hybrid) | ↑ | N/A | Similar at 1FPS | ↓ | Similar |
| Insurance Monitor | ↑ | ↑ | N/A | Similar | Similar |

*FIG. 10*

| Library | Key Functionalities |
|---|---|
| Update Management | It enables updating apps and CARWare. |
| Data Collection | It enables gathering data from the vehicle's sensors and add-on modules. |
| Application Management | It can be used to install, pause, halt, remove apps from SmartCore. |
| Port Management | It enables blocking a port, adjusting the rate of requests sent to the OBD port, Monitoring third-party dongles, and sending arbitrary requests to the OBD port. |
| Access Control | It can be used to define, modify, and remove access control policies. |

*FIG. 11*

SYSTEM AND METHOD FOR BRINGING PROGRAMMABILITY AND CONNECTIVITY INTO ISOLATED VEHICLES

CROSS-REFERENCE TO RELATED APPLICATIONS

This application claims priority to provisional applications 62/637,099 and 62/736,515, filed on Mar. 1, 2018 and Sep. 26, 2018, respectively, which are herein incorporated by reference in their entirety. This application is also related to provisional application 62/556,772, filed on Sep. 11, 2017, which is herein incorporated by reference in its entirety.

FIELD OF THE INVENTION

The present invention relates generally to vehicular technologies and, more particularly, to a reference architecture that can enable rapid development of various vehicular applications.

BACKGROUND OF THE INVENTION

Rapid technological advances in sensing, signal processing, low-power electronics, and wireless networking are revolutionizing vehicle industry. To enhance the driving experience, passenger safety, and vehicle performance, numerous vehicular technologies have been suggested and partially deployed in recent years. For example, steering assistance and cruise control have been already integrated into state-of-the-art vehicles, and vision-based collision avoidance and sign detection have shown promising results and garnered ever-increasing attention from vehicle manufacturers. However, there still exists a significant gap between resources needed for a variety of vehicular applications, particularly data-dominant, latency-sensitive, and computationally-heavy applications, and the capabilities of already-in-market vehicles.

A few vehicle manufacturers (for example, Tesla and Toyota) and several third-party companies have explored different solutions to partially address the above-mentioned gap by utilizing external computational power and storage resources provided by either the Cloud or a user's smartphone. Manufacturers have started adding built-in Cloud-based services, e.g., radio, navigation, and software updates, to their state-of-the-art products. Third-party companies have offered different dongles that can be attached to the vehicle and gather various types of data from an On-board Diagnostics (OBD) port, which provides a direct access to various sensors and built-in components. Such dongles collect and transmit data (with minimal on-dongle processing) to a smartphone or the Cloud (either directly or through the smartphone) for further processing. The majority of OBD-connected products support a single or a small set of very basic service(s), such as locking/unlocking doors or closing/opening windows. Recently, a few companies (for example, Mojio) have introduced new approaches to support multiple applications using a single OBD-connected dongle. Such a dongle transmits raw data to the smartphone/Cloud and enables developers to build on-smartphone or on-Cloud applications, however, it does not offer in-vehicle processing due to resource limitations.

Despite advantages that on-smartphone or on-Cloud (either manufacturer-enabled or dongle-based) applications offer, their acceptance and application domain are still very limited due to four fundamental reasons.

(1) Lack of programmability: Typically, vehicle manufacturers do not allow third-party developers to build customized vehicular applications at all or offer limited APIs, e.g., only for entertainment technologies. Vehicles currently have several embedded systems, commonly referred to as Electronic Control Units (ECUs). However, ECUs are designed for and optimized to support basic vehicular operations, such as anti-lock braking system and adaptive cruise control, and are not capable of handling customized applications.

(2) Drawbacks of wireless connectivity: Vehicle-to-Cloud/smartphone connectivity is not reliable for several (e.g., safety-related) applications due to its potential unavailability and intolerable round-trip delay time. Furthermore, transmitting the huge amount of data needed for data-dominant applications, e.g., traffic sign detection, is not cost-efficient.

(3) In-vehicle resource limitations: Several applications must offer a real-time response, and thus, require in-vehicle processing. Dongles and built-in computing units have limited resources and cannot host computationally heavy applications. Users' smartphones may offer extra resources, but imposing computationally heavy operations on them significantly increases their power consumption, leading to user inconvenience.

(4) Public security/privacy concerns: Add-on dongles do not use strong security mechanisms due to resource constraints, and as a result, they suffer from several security attacks, e.g., an attacker can remotely disable a braking system. Furthermore, third-party dongles can transmit a variety of private information to the Cloud, and thus, their introduction has led to public privacy concerns. For example, it is possible for insurance companies to infer the user's location by processing the vehicle's speed.

Thus, there is a need for an interoperable add-on solution (i.e., a solution that imposes minimal design modification to vehicle manufacturers and third-party vehicular companies) that addresses the above-mentioned shortcomings of previous smartphone-/Cloud-based services.

SUMMARY OF THE INVENTION

According to various embodiments, a system for vehicular application development is disclosed. The system includes a programmable on-board diagnostics (OBD)-connected dongle for providing computational and storage resources to a vehicle and hosting one or more applications in the vehicle. The dongle is configured to utilize one or more external devices, cloud servers, and add-on modules to provide additional resources for the applications and enable control of the applications. The dongle is implemented with a middleware that enables intended operations of the dongle.

According to various embodiments, a system for vehicular application development is disclosed. The system includes a programmable on-board diagnostics (OBD)-connected dongle for providing computational and storage resources to a vehicle and hosting one or more applications in the vehicle. The dongle is configured to utilize one or more external devices, cloud servers, and add-on modules to provide additional resources for the applications and enable control of the applications. The dongle is implemented with a middleware that enables intended operations of the dongle. The middleware includes an update management module, a data collection module, an application management module, a port management module, and an access control module.

According to various embodiments, a method for vehicular application development is disclosed. The method includes providing a programmable on-board diagnostics (OBD)-connected dongle for providing computational and storage resources to a vehicle and hosting one or more applications in the vehicle. The method further includes configuring the dongle to utilize one or more external devices, cloud servers, and add-on modules to provide additional resources for the applications and enable control of the applications. The method also includes implementing the dongle with a middleware that enables intended operations of the dongle.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 4 is a table illustrating different step of plate detection according to an embodiment of the present invention;

FIG. 6 is a table illustrating detection time ratio with respect to resolution according to an embodiment of the present invention;

FIG. 7 is a table illustrating detection time ratio for different implementations according to an embodiment of the present invention;

FIG. 8 is a table illustrating cellular data usage according to an embodiment of the present invention;

FIG. 10 is a table comparing ProCMotive-enabled implementations with their baselines according to an embodiment of the present invention; and FIG. 11 is a table illustrating core libraries and a summary of their key functionalities according to an embodiment of the present invention.

DETAILED DESCRIPTION OF THE INVENTION

Figure 1:
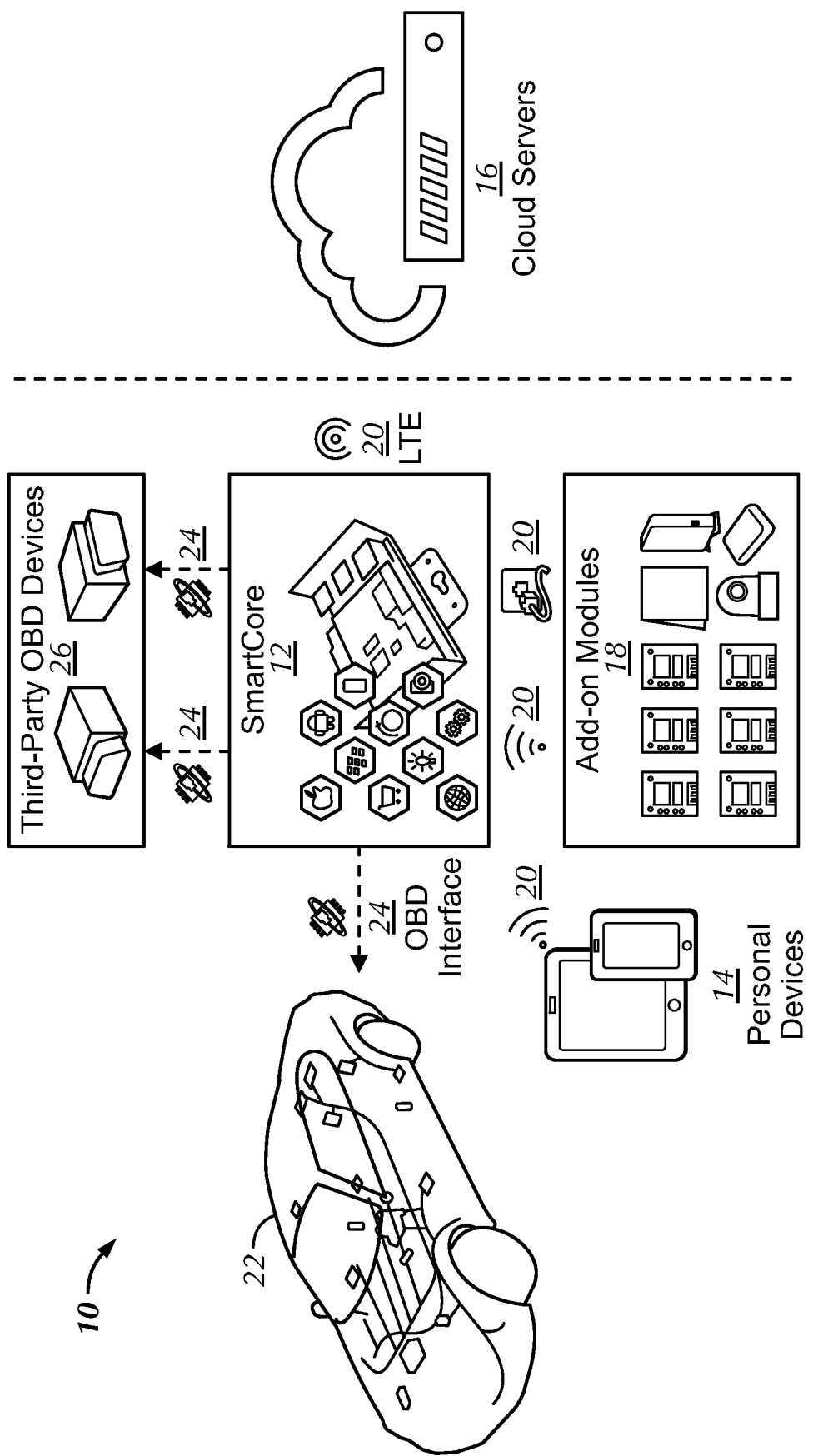
FIG. 1 is an architectural overview of ProCMotive according to an embodiment of the present invention.

In recent years, numerous vehicular technologies, e.g., cruise control and steering assistant, have been proposed and deployed to improve the driving experience, passenger safety, and vehicle performance. However, there still exists a significant gap between resources needed for a variety of vehicular applications, particularly data-dominant, latency-sensitive, and computationally-heavy applications, and the capabilities of already-in-market vehicles. To address this gap, different smartphone-/Cloud-based approaches have been proposed that utilize external computational/storage resources to enable new applications. However, their acceptance and application domain are still very limited due to programmability, wireless connectivity, and performance limitations, along with several security/privacy concerns.

As such, disclosed herein is a novel reference architecture that can potentially enable rapid development of various vehicular applications while addressing shortcomings of smartphone-/Cloud-based approaches. The architecture is formed around a core component, generally referred to herein as SmartCore, which is a privacy/security-friendly programmable dongle that brings general-purpose computational and storage resources to the vehicle and hosts in-vehicle applications. Based on the disclosed architecture, an application development framework is established for vehicles, generally referred to herein as ProCMotive. ProCMotive enables developers to build customized vehicular applications along the Cloud-to-edge continuum, i.e., different functions of an application can be distributed across SmartCore, a user's personal devices, and the Cloud.

In order to highlight potential benefits that the framework provides, two different vehicular applications were developed based on ProCMotive as nonlimiting examples, namely Amber Response and Insurance Monitor. These applications were evaluated using real-world data and compared with state-of-the-art technologies.

The novel reference architecture for vehicular application development disclosed herein generally relies on four fundamental components: (i) SmartCore, a privacy/security-friendly programmable OBD-connected dongle that can host multiple applications in the vehicle, (ii) the user's personal devices that provide additional resource to applications running on SmartCore and/or enable the user to control them (via a graphical user interface), (iii) Cloud servers, which provide extra resources, keep application installation packages, and offer remote software update, and (iv) add-on modules that enable adding extra input/output devices and computational/storage units to SmartCore if needed. Based on this architecture, ProCMotive enables developers and researchers to rapidly prototype and deploy customized vehicular applications.

SmartCore is the core component of ProCMotive and aims to partially push computational/storage resources from the Cloud to the vehicle. In particular, it:

(1) attaches to the OBD port and replicates a similar interface for third-party dongles. This ensures interoperability, i.e., after adding SmartCore, both the vehicle and previously-designed OBD dongles can resume their regular functionalities.

(2) potentially enables the development of various novel (in particular, latency-sensitive and data-dominant) vehicular third-party applications. It exploits its in-vehicle computational/storage resources to either fully host lightweight latency-sensitive applications or partially implement data-dominant and computationally-heavy applications.

(3) acts as a gateway for third-party OBD-connected dongles. It enables real-time monitoring of other OBD-connected dongles to detect and address any malicious activities (e.g., launching a denial-of-service attack or stealing private information) initiated by them.

(4) offers a context-aware access control scheme that enables the user to decide what information they want to share with each in-vehicle application or OBD-connected dongle with respect to the current context.

(5) implements a set of privacy-friendly data manipulation functions that aim to minimize the amount of private information leakage by removing inessential parts of data before sharing them with third-party applications and untrusted OBD-connected dongles.

Shortcomings of Previous Approaches

Lack of programmability: State-of-the-art vehicles utilize a compound of ECUs and on-board buses. They can incorporate several (typically up to 100) ECUs, which host vehicle-specific software. ECUs provide in-vehicle resources to enables a variety of basic vehicular operations, such as anti-lock braking system and adaptive cruise control. Vehicle manufactures have supported ECUs programming and tuning to enhance the vehicle performance even after its initial sale or fix software bugs if needed. However, these built-in computational resources do not offer the flexibility provided by general-purpose computing units: they cannot be easily reprogrammed to host third-party vehicular applications. This limitation has been imposed by manufacturers to ensure the quality of service (QoS) and reliability of critical (in particular, safety-related) operations handled by ECUs. Therefore, despite the existence of in-vehicle computational resources, utilizing them to implement customized vehicular applications is neither simple nor recommended. Some manufacturers have started offering APIs to application developers. However, these APIs are very limited and only target a small application domain, particularly entertainment applications.

Drawbacks of wireless connectivity: The issues associated with the use of vehicle-to-Cloud and vehicle-to-smartphone wireless connectivity include unavailability of wireless connectivity, intolerable response time, and limited cellular data and/or bandwidth.

Using cellular connectivity to transmit the data from the vehicle to the Cloud will result in the unavailability of the Cloud-based services when the cellular connectivity is not available, for example, when the vehicle goes through a tunnel. Furthermore, if a dongle uses the smartphone to transmit the data to the Cloud, both vehicle-to-smartphone and vehicle-to-Cloud communications become unavailable when the smartphone dies. This will result in the interruption of vehicular services, and significantly limit their applicability. In particular, safety-related applications that need a reliable continuous stream of data, e.g., collision detection and security attack detection, cannot completely rely on wireless connectivity. Thus, such applications should be implemented (at least partially) on the vehicle itself.

Several vehicular applications need real-time decision making, for example, traffic sign detection and collision prediction, and therefore, may not tolerate the response time offered by the Cloud (i.e., time needed for transmitting the data from the vehicle to the Cloud, processing them on the Cloud, and getting the response back from the Cloud). Such applications should be implemented using close-to-the-vehicle computational/storage resources.

Data-dominant applications (in particular, image processing-based collision detection or a sign detection algorithm) capture and process a huge amount of data (up to tens of GBs of data every day). For such applications, transmitting the raw data to the Cloud is not cost-efficient. Moreover, if each data chunk is huge (e.g., a high-resolution image collected from an on-vehicles camera), sending it to the Cloud or the user's smartphone may be time consuming, leading to an intolerable end-to-end application response time.

Public security/privacy concerns: Security and privacy concerns of previously-proposed approaches include security threats and private information leakage.

Vehicles are interesting targets for attackers due to their mission-critical operations. Any security attack against vehicles, especially large-scale attacks, may lead to life-threatening consequences. For instance, the federally-mandated OBD port offers an unprotected standard interface that can be exploited by attackers to take the control of mission-critical components, e.g., the braking system. It has been shown that attackers can launch a multitude of well-known security attacks against the vehicles using the OBD port, ranging from Denial of Service (DoS) attacks to packet sniffing. Several already-in-market OBD dongles are vulnerable to well-known security attacks, offering a valuable opportunity for attackers to remotely take the control of several components embedded in the vehicle.

Since the OBD interface offers a full access to all OBD-connected dongles, they can potentially collect a variety of sensitive information (e.g., sensory readings, GPS coordinates, and the vehicle's identification number and model) without the user's permission, leading to several privacy concerns. It has been shown that an insurance company can potentially track all user movements (and also extract several locations of interest) using the vehicle's speed collected from OBD port.

In-vehicle resource limitations: Several applications must offer real-time (or near real-time) responses, and thus, require in-vehicle processing. Currently-in-use after-market dongles have very limited resources and cannot host customized applications in the vehicle. Furthermore, built-in computing units (for example, ECUs) embedded in already-in-market vehicles neither provide programmability nor high performance, and thus, cannot host (and tolerate the overhead of) in-vehicle customized applications. Moreover, relying on users' personal devices may offer extra resources. However, imposing computational-heavy operations on them may significantly increase their power consumption, leading to user inconvenience.

Additional Design Considerations

Interoperability: SmartCore acts as a gateway for other third-party OBD-connected dongles. It connects to the OBD port and replicates a similar interface that can be used by other third-party OBD-based devices, e.g., insurance dongles. Such devices can send their requests to the OBD port only through SmartCore, while SmartCore is actively enforcing appropriate security and privacy policies. This ensures interoperability: if an OBD-based dongle complies with the policies, it can perform its regular operations without any design modification, despite the attachment of SmartCore to the OBD. Interoperability is essential to minimize the additional costs associated with the use of ProCMotive and maximize its acceptance.

Extensibility: ProCMotive should be implemented so that its application domain can be extended in the future with minimal design modifications. SmartCore offers short-range wireless connectivity (e.g., Bluetooth and WiFi) and long-range wireless connectivity (e.g., cellular), along with several Universal Serial Bus (USB) ports, so that additional input/output, storage, and computing devices can be easily added to the architecture if needed. For example, developers can process the sensory data gathered from the vehicle, along with data collected using add-on input devices (e.g., a camera), to design and develop novel vehicular applications.

Virtualization: Virtualization, i.e., creating multiple isolated containers to host different applications on the same operating system (OS), is highly desired to ensure security. A container is software at the application layer that maintains application packages (i.e., codes and their dependencies). SmartCore hosts several third-party applications at the same time, and it uses a separate container for each application. This ensures that an application can neither see nor affect applications running in other containers. Moreover, each container has its own network stack, and therefore, it does not have privileged access to the sockets or interfaces of another container.

Remote update: To enhance the performance and security and provide regular fixes for features that are not working as intended, it is essential to offer remote software updates. To ensure user convenience, an over-the-Internet remote update is highly desired. In ProCMotive, Cloud servers can host software updates (e.g., the latest version of applications, middleware, and OS) and regularly inform the user if a new update is available.

Architecture Overview

An architectural overview of ProCMotive is disclosed herein. The proposed architecture is motivated by the insight that close-to-the-user computation can open up new opportunities for addressing various security/privacy concerns associated with the use of Internet-connected vehicles, enhancing the performance of vehicular applications, and enabling new applications that were not feasible before using previous architectures. FIG. 1 presents the proposed reference architecture.

As illustrated in FIG. 1, a ProCMotive system 10 generally includes four main components, namely a SmartCore component 12, personal user devices 14, Cloud servers 16, and add-on modules 18. These components can communicate with each other via various communication channels 20 such as but not limited to wireless telecommunications networks, Wi-Fi, Bluetooth, or wired connectivity. To ensure security, in this architecture, all communication channels 20 (except OBD-based channels that are implemented based on a federally-mandated guideline) can be encrypted.

SmartCore 12 is an OBD-connected dongle that brings sufficient computational power and storage capacity to a vehicle 22 to support several fundamental operations. In the proposed architecture, SmartCore 12 is connected to the OBD port of the vehicle 22 via an OBD interface 24 for two main reasons. First, it can access various types of sensory (e.g., coolant temperature, engine RPM, ambient temperature), and non-sensory data (e.g., GPS coordinates, the vehicle's make and model) from the vehicle 22. Second, it can be powered through this port by accessing the vehicle's battery.

SmartCore 12 can collect data needed for various vehicular applications from two main sources: the sensors embedded in the vehicle 22 and add-on sensors. The OBD interface 24 enables SmartCore 12 to access various built-in components including sensors. SmartCore 12 can request different sensory data by sending their corresponding diagnostics parameter IDs (PIDs), which are supported by vehicle manufacturers to facilitate diagnostics. Moreover, add-on input sensors can be connected to SmartCore 12 over Wi-Fi or Bluetooth, providing additional information about the environment.

SmartCore 12 has sufficient resources to perform a wide range of data processing algorithms (in particular, privacy-enhancing, data compression, and data analytics) in the vehicle 22. Depending on the available resources, performance requirements, and QoS guarantees, applications can be partially or fully implemented on SmartCore 12. In-vehicle processing opens up a new opportunity for developing several new applications. For example, consider a sign detection algorithm that aims to recognize the traffic signs by processing the images captured from the environment. If the vehicle manufacturer does not support this application by default, incorporating it into already-in-market vehicles is not feasible due to the shortcomings of previously proposed architectures. However, SmartCore 12 enables in-vehicle image processing for such an application, minimizing the vehicle-to-Cloud transmission overhead and offering short response time. Moreover it can be used to implement privacy-enhancing algorithms that remove inessential portions of raw data (e.g., the whole image) before transmitting it to the Cloud or sharing it with other OBD-connected devices 26, e.g., insurance dongles.

While various access control schemes have been proposed for personal devices 14 (such as but not limited to smartphones and tablets), they have been neither well-established nor well-studied in the domain of Internet-connected vehicles and vehicular applications. The OBD protocol itself does not offer any access control solution to specify when, where, and to what extent the sensitive data can be gathered from the OBD. In order to prevent forming a monopoly in the auto repair business, vehicles manufacturers are mandated by law to provide full access to built-in components via OBD port. Although OBD-connected dongles can access various sensors and components embedded in the vehicle to enable new vehicular applications, their usage can lead to serious security and privacy concerns if their access level is not limited. SmartCore 12 offers an access control scheme to limit the access level of (i) applications hosted on the SmartCore 12 and (ii) third-party OBD-based dongles 26. It continuously monitors the behaviors of hosted applications and third-party dongles 26 and ensures that they comply with a set of access control policies. SmartCore 12 can support at least two types of policies, such as predefined policies and context-aware user-defined policies.

Regarding predefined policies, upon the installation of an application or the attachment of a new dongle to SmartCore 12, a set of predefined policies are assigned to the application/dongle. These set of policies are determined based on two parameters: the vehicle's specifications (e.g., vehicles' manufacturer, make, and model) and the specification of the application/dongle (e.g., the application's intentions or the manufacturer/model of the dongle). The vehicle's specification can be directly obtained from the OBD port. It is used to take the vehicle's manufacturer-reported OBD issues and specific characteristics into account. For example, the attachment of any OBD dongle to a Ferrari 430 will disable its Traction Control System. Thus, for this vehicle, the default access level of applications/dongles should ensure that the OBD port cannot be accessed when the car is moving. The specification of the application/dongle is used to determine its expected access level based on its intended operations. For example, it is sufficient for an insurance dongle to only access a subset of the vehicle's sensors, e.g., the speedometer and odometer.

Regarding context-aware user-defined policies, although predefined policies provide basic protection against different security/privacy attacks, it is unlikely that their privacy and security implications would be fully understood by regular users. Indeed, users commonly under-/over-estimate the level of protection that these policies provide. To take users' preferences into account, a domain-specific context-aware access control scheme can be included in SmartCore 12. Context-aware user-defined policies offer the potential to correctly reflect the user's security/privacy preferences. However, if it is not user-friendly, the amount of essential user effort needed to initialize, modify, and maintain a comprehensive set of context-dependent policies is high. A rich set of contexts enables the user to define fine-grained policies. However, it is well-known that regular users are not willing to spend significant amounts of time to adjust the policies with their preferences. In addition, it is questionable, whether users are capable of understanding the implications of their policy settings. Thus, SmartCore 12 should offer a user-friendly policy managements system, while enabling users to define/modify various policies with respect to a rich set of domain-specific high-level contexts (e.g., whether the vehicle is involved in an accident).

In order to enable real-time monitoring of other OBD-based third-party dongles 26, such dongles 26 are only allowed to indirectly access OBD port through the interface 24 implemented by SmartCore 12. SmartCore 12 should isolate third-party OBD-based dongles 26 (i.e., they can neither directly communicate with the vehicle's OBD port nor see each other), monitor and process commands/message initiated from them, and respond to such commands/message (with respect to certain security/privacy policies specified by the access control scheme). Port management enables this isolation and handles requests sent to or received from the vehicle's OBD port.

Modern personal or user devices 14 (e.g., smartphones and tablets) have become a vital part of everyday life. They are equipped with many compact built-in sensors (e.g., accelerometers, magnetometers, and barometers), various communication capabilities (e.g., WiFi, LTE, and Bluetooth), powerful microprocessors, and high-volume storage in order to support a variety of applications. In addition to enabling such applications, their spare resources can be utilized to offer additional resources (e.g., computational power) and inputs/outputs (e.g., sensors) to applications running on SmartCore 12. For example, if a developer wants to build an automatic headlight control application (i.e., an application that can automatically turn on the vehicle's headlights based on the existing ambient light) on a vehicle that does not support this functionality. He can potentially utilize the ambient light sensor embedded in the user's smartphone device 14 to sense the ambient light and then launch appropriate controlling commands to control the vehicle's headlight using SmartCore 12. Furthermore, its display can offer a user-friendly interface, which can be used to control various functionalities of SmartCore 12.

In the disclosed architecture 10, the Cloud servers 16 can have three fundamental responsibilities: (i) maintaining application packages, (ii) offering additional computational/storage resources to partially or fully implement an application on the Cloud, and (iii) enabling remote updates of the software, in particular, applications installed on SmartCore 12 and the underlying middleware and/or OS.

Add-on modules 18 are either additional input/output devices, including, but not limited to, cameras, sensors, GPS receivers, microphones, voice assistant systems, and computing/storage units, that can be connected to SmartCore 12 via WiFi, Bluetooth, or wired connectivity 20. For example, a vehicle-mounted camera can gather valuable information about the vehicle's surroundings, enabling a variety of image processing-based applications. In the disclosed architecture 10, add-on modules 18 offer extensibility.

Implementation Overview

Based on the reference architecture discussed above and the intended operations of its components, a prototype for the ProCMotive system 10 was developed. The prototype implementation offers a framework that provides the backbone for vehicular application development, considering various domain-specific challenges: programmability, wireless connectivity, and performance shortcomings, along with security/privacy concerns. The implemented software components and underlying hardware/infrastructure are discussed below.

The prototype implementation includes three main software components: (i) CARWare: a middleware (i.e., a software that acts as a bridge between the native OS and applications) that enables SmartCore's intended operations, (ii) a smartphone (such as an Android) application that enables the user to control different vehicular applications and manage access control policies using their smartphone, and (iii) a trusted web server on the Cloud that enables the user to download/update vehicular application packages.

Figure 2:
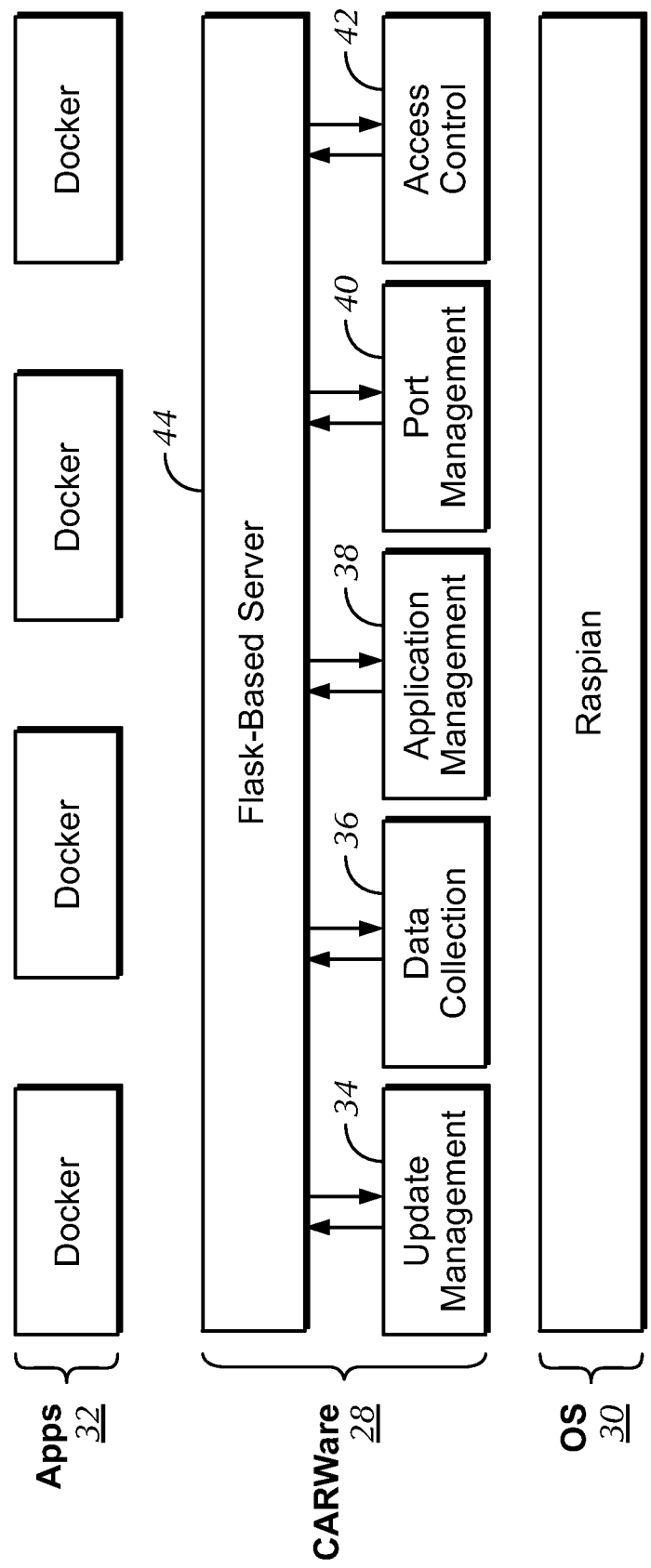
FIG. 2 is a diagram of software components according to an embodiment of the present invention.

Regarding CARWare, the core middleware, as the core of reference architecture, SmartCore 12 offers several functionalities. As illustrated in FIG. 2, CARWare 28 was implemented to enable the intended functionalities of SmartCore 12. CARWare 28 comes between the native OS 30 (Raspbian in the prototype though other OSs can be used) and the application layer 32. CARWare 28 enables remote update via an update management module 34, data collection (from both OBD port and add-on inputs) via a data collection module 36, application management via an application management module 38, OBD port management via a port management module 40, and access control via an access control module 42. CARWare 28 also provides a RESTFul API through which it handles various requests created by applications and returns a response in JSON format (i.e., an open-standard file format that uses human-readable text).

The update management module 34 (one of five core software libraries in CARWare 28) provides various functions needed for remotely updating application packages and the CARWare 28. In one implementation of CARWare 28, the full functionally of the API was used to develop a trusted Android application (with administrative privileges) that can download, install, and run the last version of application packages and CARWare stored on the Cloud if an update is necessary. Although the update management library 34 enables updating applications 32 and the middleware 28, for security reasons, a regular application (i.e., an application without administrative privileges) should not be allowed to update other applications or CARWare: a third-party application, that is not given the administrative password, can only update itself. Furthermore, to ensure the safety of the driver and the passenger, the update management API 34 only accepts requests when the vehicle is not moving: the update management creates an OBD request with the PID of OD, asking for the current vehicle's speed. If the vehicle's speed is zero it processes the request; otherwise the request is dropped.

For vehicular applications 32, two applications can update a specific vehicular application: (i) the vehicular application itself or (ii) an application with administrative privileges. In fact, an update request must provide the application identifier along with either the application token or the administrative password (that the user sets in the initial setup of SmartCore). If the provided credentials are correct, then the request will be processed as follows. First, the latest version of the application will be requested from a Vehicular Application Store 16 (the cloud server described earlier). Upon receiving a request from CARWare 28, Vehicular Application Store 16 provides the latest version of the application package (a Docker image including the application and its dependencies along with a JSON file describing the application and its requirements and requested sensors/resources). Then, if the safety requirement is met (the car is not moving), the update management 34 first pauses the container that runs the old version of the vehicular application and then runs a new container using the latest version of the application.

For CARWare 28, update management API 34 only allows an application with administrative privileges to update the core middleware. To update CARWare 28, an update request must be created and sent to the web server 44 running in CARWare 28, which forwards the request to the update management component 34. If the provided credentials are correct and the vehicle is not moving, an external script (running on the underlying OS 30) will download the latest version of CARWare 28, pause all application containers, install the new version of CARWare 28, kill/remove the previous version and run the new version, and eventually resume the paused containers.

CARWare 28 offers an API 36 that can be used to facilitate data collection from the vehicle's sensors and SmartCore's add-on inputs 18. One implementation of the API 36 enables accessing over 30 types of the sensory data from the vehicle 22, along with different types of data provided by three add-on inputs 18: a vehicle-mounted camera (such as a Raspberry Camera Module V2), a set of sensors (such as a TI Sensor Tag that has built-in accelerometer, magnetometer, temperature, and air pressure sensors and is connected to SmartCore 12 via Bluetooth Low Energy), and a GPS receiver (such as USGlobalSat GPS receiver). In order to fetch sensory data, the vehicular application 32, that runs in a container, communicates with the web server 44 running within CARWare 28. For data collection, the application 32 creates a request including its unique credentials (an application identifier and a token) along with the description of data that is needed (for each data type, the request includes two fields: source of data, i.e., from the 'vehicle' or 'add-on' inputs, and type of data, e.g., acceleration or the vehicle's speed). Upon the arrival of a request, CARWare 28, via the data collection module 36, first checks if the request complies with access control policies. If so, it reaches the requested data source, collects the data, and returns a response including the data (in JSON format) to the application. Otherwise, it rejects the request.

Regarding the application management module 38, in-vehicle application hosting requires fine-grained application management. Application management 38 enables the user to (use a smartphone application developed based on its API and) download a vehicular application 32 from Cloud server 16 to the SmartCore 12, run the application 32 (inside a container separated from other applications), pause all processes involved in the application 32, and completely halt the application 32. Using containers allows independent isolated applications to run simultaneously within a single OS 30, avoiding the overhead of starting and maintaining several virtual machines. In on embodiment, Docker technology is utilized to create our isolated containers.

Regarding the port management module 40, CARWare 28 offers an API to enable applications to control the OBD port if needed. In particular, it provides four functions: port block, rate adjustment, probing a dongle, and sending a request. Using port management 40, an application 32 can (i) block all requests coming from an OBD-connected dongle (given its unique identifier), (ii) set the maximum expected rate of OBD requests initiated from an application/dongle, (iii) capture/monitor all the packets initiated from a dongle, and (iv) create and transmit an arbitrary OBD request. As discussed later, using this API 40, developers can easily design security/privacy protection applications, which can take the control of OBD port upon detection of a malicious activity.

Figure 3:
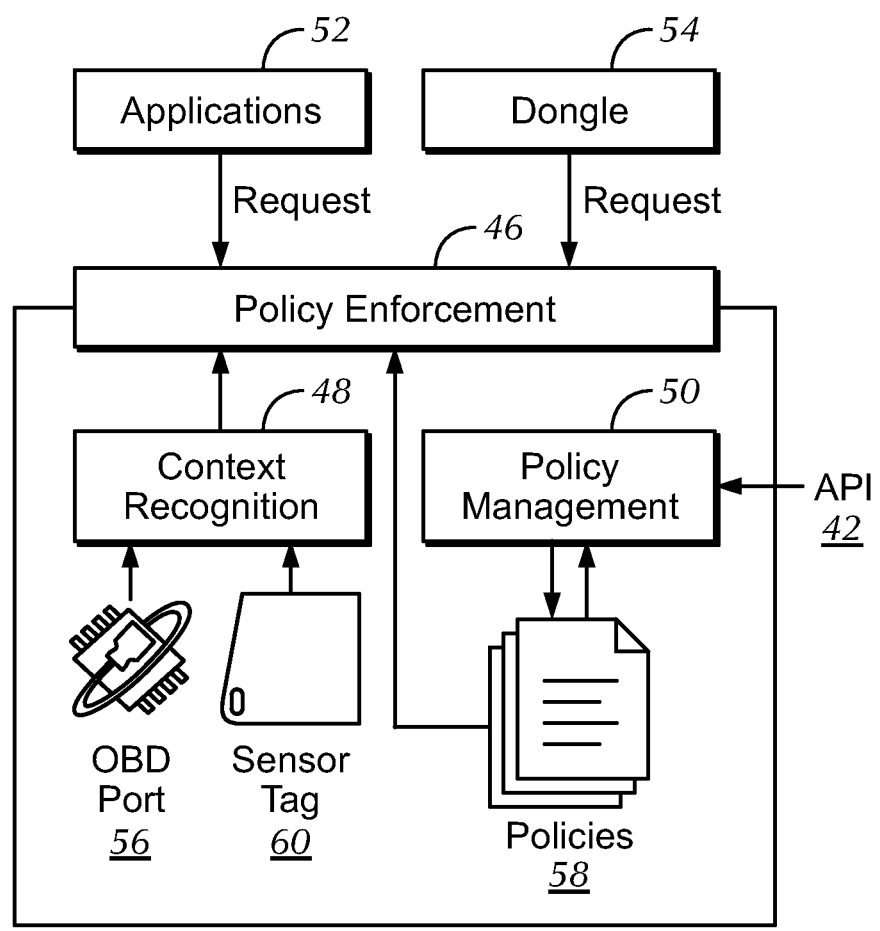
FIG. 3 is a diagram of access control components according to an embodiment of the present invention.

As illustrated in FIG. 3, the access control component 42 includes three subsystems: policy enforcement 46, context recognition 48, and policy management 50 that closely collaborate with each other.

Policy enforcement 46 ensures that all applications and third-party OBD dongles always comply with both pre-defined and user-defined policies. For each request generated from an application 52 or a dongle 54, if the request is authorized, it lets the request to proceed; otherwise, it blocks the request, i.e., the request is neither processed by Smart-Core 12 nor forwarded to the OBD port 56 in the vehicle 22.

Context recognition 48 supports a list of contextual information (it continuously detects the current contexts), enabling the user to set their preferences with respect to this information.

Regarding operational contexts, in one embodiment, the context recognition 48 supports contextual information related to the operation of the vehicle 22 such as vehicle status and health status. The context recognition 48 continuously detects whether the vehicle 22 is idle or moving. This allows the user to limit applications/dongles 52/54 based on the current status of the vehicle 22. For example, the user can set a policy to disable all diagnostic OBD dongles (that may send safety-critical commands to the vehicle 22) when the vehicle 22 is moving. This can potentially prevent several life-threatening security attacks (e.g., disabling the braking system) even if the dongle is hacked and can be controlled by a remote attacker. Moreover, the context recognition 48 detects the engine's health status (e.g., checks whether the check engine light is on/off). Several insurance companies, e.g., MetroMile, offer dongles that are also able to read all in-vehicle data, find fault codes, and describe how the user can address the issue. By setting policies 58 based on the health status, the user can allow such dongles to only access diagnostic data upon the appearance of a fault.

Regarding situational contexts, in one embodiment, situational contexts can be defined as involvement in an emergency and the presence of an external alert message. Context recognition 48 frequently collects data from sensors embedded in a sensor tag 60, e.g., accelerometers, and on-vehicle sensors, e.g., ABS and airbag sensors, to detect the occurrence of a collision. Moreover, context recognition 48 listens to a trusted communication channel through which trusted alert messages (e.g., from law enforcement) are transmitted to the vehicle 22. This enables the user to set situational policies 58. For example, a user may be willing to give an insurance dongle the permission to transmit the location of an accident to the company. Similarly, they may want to allow emergency responders to access location information when asked by a law enforcement agency.

Regarding location-based contexts, there are different scenarios in which the user might like to control the access level of the application/dongle 52/54 with respect to the current location of the vehicle 22. For example, the user may be willing to share some information with applications/dongles 52/54 only when in trusted locations. Furthermore, the user might want to stop sharing his sensitive information (e.g., GPS coordinates) when in specific locations (e.g., home or office). One embodiment lets the user to set policies 58 with respect to a set of locations of interest: user-defined locations (home and office addresses) and manufacturer-trusted addresses (locations of trusted auto repair shops).

Policy management 50 is responsible for getting the feedback from the user and enabling the user to enforce his security/privacy preferences. It provides an API 42 which can be used to add, edit, and remove access control policies for each application 52 or third-party dongle 54 attached to SmartCore 12.

In the prototype embodiment, the ProCMotive system 10 has a trusted Cloud-based web service 16, called Vehicular Application Store that is written in Python based on Flask framework and can be hosted on Amazon Web Services. It offers an API that can be used to: (i) list available vehicular application packages, and (ii) download the last (or a specific) version of an application files (a Docker image including the application and its dependencies along with a JSON file describing the application and its requirements and requested sensors/resources). Using the API provided by this server 16 and the API provided by the update management unit 34 of SmartCore 12, a smartphone application was developed that allows the user to download, install, and update applications/CARWare 32/28.

As described earlier, the Cloud server 16 has a vital role in the implementation of various vehicular applications 32 such as providing extra computational/storage resources for each application 32. While designing different vehicular applications 32 based on ProCMotive 10, additional resources of the Cloud 16 were also used.

Using the APIs provided by Vehicular Application Store 16 and SmartCore 12, a smartphone application was implemented on the smartphone 14 that communicates with both the store 44 and SmartCore 12 and offers a user-friendly interface for managing access control policies and vehicular applications and updating CARWare/applications.

Regarding access control management 42, the user can set, modify, delete user-defined access control policies. For each vehicular application 52 or OBD dongle 54, CARWare 28 maintains an access control file (in JSON format) that specifies its access control policies. The smartphone 14 communicates with the web server 44 within CARWare 28 to reflect user preferences and update the access control files.

Regarding application management 38, to install and run a new application, the user can select one application from the list of available vehicular applications stored on Vehicular Application Store 44. When the user intends to download and run an application on SmartCore 12, the request is sent from the smartphone 14 to the web server 44 within CARWare 28 and is handled as follows: the server 44 communicates with Vehicular Application Store 16 and fetches the application package, it then runs the application in an isolated container. Using the smartphone application, the user can check the status of all vehicular applications 32 running on SmartCore 12 and manage them (pause, halt, and remove their containers) if needed.

Regarding application/CARWare update management 34, the smartphone application first sends a request to SmartCore 12 and fetches the descriptions of applications/CARWare 32/28 currently installed on SmartCore 12. Then, the user can select one vehicular application 32 (or CARWare 28) from the list of available applications installed on the SmartCore 12 to be updated. Upon selection of a vehicular application 32 (or CARWare 28), the smartphone application sends an update request including the application identifier and administrative password to the web server 44 running inside the CARWare 28. Afterwards, SmartCore 12 communicates with Vehicular Application Store 16 and downloads the latest version of the application package. Eventually, if the safety requirement is met (the car is not moving), CARWare 28 updates the vehicular application 32 (or itself 28).

Regarding hardware/infrastructure, SmartCore 12 may be implemented in a variety of configurations involving general computing devices. The prototype embodiment was based on Raspberry Pi 3 that comes with Raspbian, its native Debian-based computer OS. SmartCore 12 also utilizes a modem and a CAN-bus interface. The prototype embodiment was based on a NETGEAR 4G LTE Modem (Model LB1120) with a T-Mobile Prepaid Plan that enables wireless connectivity over LTE and an OBD PiCAN 2 board that provides CAN-Bus capability for the Raspberry Pi. Wireless channels, such as LTE, Bluetooth Low Energy, and Wi-Fi are offered as nonlimited examples. Raspberry Pi has built-in cryptographic modules that support strong encryption for these communication channels. Thus, to ensure security, all communication channels to/from SmartCore 12 can be encrypted (except the wired OBD-based communication channels).

Furthermore, SmartCore 12 can support any number of add-on modules 18. Three nonlimiting examples include: (i) a TI Sensor Tag, a Bluetooth-enabled sensory unit that includes various sensors such as accelerometer, magnetometer, and air pressure, (ii) a Raspberry Camera V2, a vehicle-mounted camera that can capture video frames from the environment, and (iii) a USGlobalSat GPS that is a GPS receiver.

A Nexus 5S was used to test Android applications developed based on the prototype implementation and Amazon Webservices was utilized as the Cloud, though these implementations are not intended to be limiting as any smartphone or cloud service can be utilized.

Nonlimiting Applications

Below are two nonlimiting novel applications implemented based on the ProCMotive system 10. These applications were evaluated using real-world data and benefited from in-vehicle processing via SmartCore 12.

Application 1: Amber Response

In the U.S., an Amber Alert is activated when a law enforcement agency has admissible reasons to believe that a child has been abducted and in danger of serious life-threatening conditions or death. The Amber Alert system relies on the nearby people to get information about the abduction. It informs the public about the abduction by broadcasting the make, model, color, and plate number of the abductor's vehicle to nearby smartphones, enabling the entire community to assist in the safe recovery of the child. It has been shown that this scheme is only slightly effective and may cause user inconvenience (for example, the alert will be sent to all nearby people even if they are not walking/driving and cannot provide useful information). Since the inception of the program in 1996 through 2015, around 43 children, on average, have been safely recovered every year specifically as a result of an AMBER Alert being issued, whereas the average number of abduction in the U.S. is around 800,000 every year. Thus, a more effective alternative system is highly needed. Such a system, called Amber Response, is disclosed and implemented using the ProCMotive system 10. Amber Response utilizes a vehicle-mounted camera (an add-on module 18), that continuously captures several frames per second from the environment, and processes image frames to automatically find the abductor's vehicle (given the database of active Amber Alerts). Different functions of this application can be distributed across SmartCore 12 and the Cloud 16.

The Amber Response application maintains a database of active Amber Alerts, including make, model, color, and plate number of abductors' vehicles. This database is located on the Cloud server 16 and can be updated by responsible agencies. The application searches through the video frames to find a vehicle whose features match the ones of a record in the database. Upon the detection of a suspicious vehicle, the application sends the vehicle's GPS coordinates to the Cloud server 16, informing law enforcement agencies.

Using ProCMotive 10, three different versions of Amber Response have been implemented: (i) a Cloud-based, (ii) a SmartCore-based, and (iii) a hybrid version that exploits both Cloud and in-vehicle computation/storage resources.

In the cloud-based version, SmartCore only collects the data (video frames) and uploads them to the Cloud without modification. After uploading the frames, an on-Cloud server receives and processes them to find a plate number that matches the plate number of a suspicious vehicle in the database. An OpenALPR library can be utilized to implement plate detection algorithm on the Cloud. Plate detection algorithm has eight main steps, which are briefly described in the table in FIG. 4.

In the SmartCore-based version, the application installed on SmartCore frequently (e.g., every 30 seconds) fetches the database of active Amber Alerts to ensure that it maintains the last updated version of the database. It then captures video frames from the camera and runs the plate detection algorithm described in FIG. 4. After extracting all plate numbers from the frames, it searches through the database to find a match and sends a report, including the vehicle's GPS coordinates, to the Cloud if a match is found.

The hybrid implementation exploits both in-vehicle and on-Cloud resources. In this scenario, Amber Response application has been partially implemented on SmartCore. On SmartCore, it first captures the frames from the camera. Then, it performs a lightweight image processing function to extract all plate areas in each frame (Step 1 in FIG. 4). Afterwards, for each vehicle in the frame, it estimates the vehicle's color from a small area above its plate (whose size is %10 of the detected plate's area). If the vehicle's color matches the color of one of the suspicious vehicles reported in the database, it transmits the corresponding plate area to the Cloud for further processing. The on-Cloud side of the application, receives and processes the images that only contain the area. Upon detection of a suspicious vehicle, it sends a request to the application installed on SmartCore, asks for current location of the vehicle, and informs the law enforcement agency.

The dataset used to evaluate Amber Response is described below along with an examination and comparison of different implementations of Amber Response from three perspectives: (i) performance, (ii) cellular data usage, and (iii) privacy leakage.

The dataset involves downloading 12 videos uploaded on YouTube that were captured using a camera mounted behind the mirror of a moving vehicle. These videos have the resolution of at least 1080p and frame rate of at least 10 frames per second (FPS). To construct the dataset, 72 videos were created by varying both resolution and frame rate of the downloaded videos. For each original video, the dataset includes six videos with different resolutions, i.e., 1080p and 720p, and frame rates, i.e., 1, 5, and 10 FPS. Each video is about 10 minutes and the suspicious vehicle, i.e., the vehicle that Amber Response aims to find, appears in a random time in the footage (i.e., for each video, a single vehicle is randomly chosen and its specifications are added to the database of suspicious vehicles stored on the Cloud). Based on the empirical results, Amber Response can accurately (with the accuracy of 100%) detect the abductor's vehicle when the frame rate is equal to or greater than 1 FPS. Therefore, the minimum frame rate is set to 1 FPS for evaluation.

Three implementations of Amber Response (Cloud-based, SmartCore-based, and Hybrid) were first quantitatively evaluated using the above-mentioned dataset. Then, it is briefly described how in-vehicle data processing can enhance the user's privacy in this application.

In order to compare the performance of the three implementations, Detection Time Ratio $$\left(\text{i.e., } DTR = \frac{T_{detection}}{T_{appearance}}\right)$$

is defined and reported to represent how much time each implementation takes for processing one second of the video until it finds the abductor's vehicle. This metric enables estimating the delay in the detection of the abductor's vehicles in real-world scenarios: if the suspicious vehicle appears after $T_{appearance}$ seconds (from when the camera starts capturing the video), Amber Response detects it after $T_{appearance}*DTR$. Indeed, it reports the suspicious vehicle with a delay of $T_{appearance}*DTR-T_{appearance}$ seconds to the law enforcement agency. For each implementation, the DTR highly depends on frame rate and resolution of the video, and how much processing power is provided by SmartCore. Next, it is examined how average DTR changes with respect to these parameters.

Figure 5:
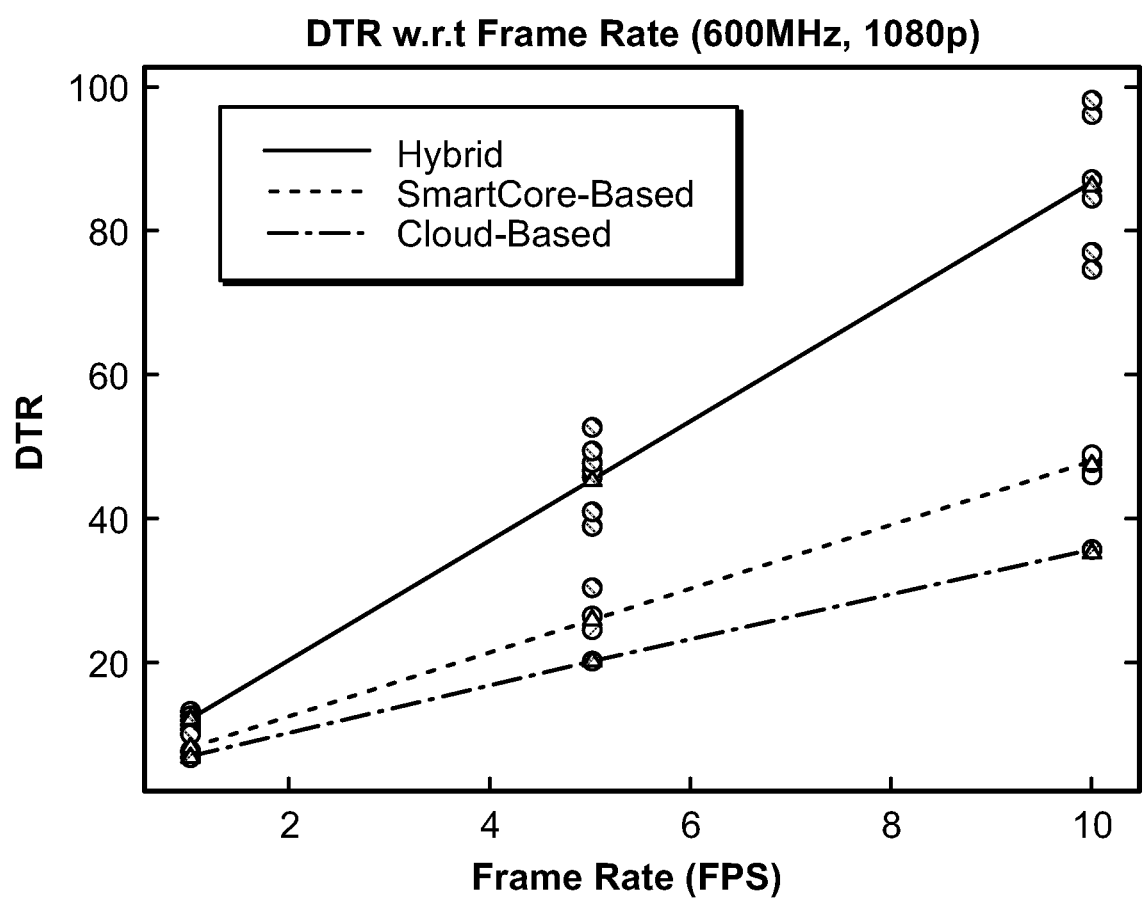
FIG. 5 is a graph illustrating detection time ratio with respect to frame rate according to an embodiment of the present invention.

In order to evaluate how DTR changes with respect to the frame rate, Amber Response was examined using a subset of the videos (36 videos) in the dataset that have the same resolution (1080p) and it is ensured that SmartCore provides similar processing power for all these videos by manually enforcing its CPU to work at 600 MhZ (on Raspbian, this can be done by editing "config.txt" located at "/boot/config.txt"). FIG. 5 demonstrates how DTR changes with respect to the frame rate for this experimental scenario. As the frame rate increases (and consequently, the image processing algorithm becomes more computationally-heavy), utilizing the Cloud for processing becomes more reasonable from performance perspective, whereas when the frame rate is low (1 FPS) all three implementations become similar from performance perspective even though the computational power of SmartCore is much less than that of the Cloud.

Furthermore, to evaluate how DTR changes with respect to the resolution of the video, a similar experiment is repeated: the CPU is manually enforced to work at 600 Mhz and the videos with 1 FPS are used. The table in FIG. 6 summarizes the results of this experiment. As expected, for each implementation, a lower resolution video offers a better DTR.

As shown in FIG. 5, in the first experimental scenario, both Cloud-based and SmartCore-based implementations outperformed the hybrid one. For hybrid implementation, $T_{detection}$ highly depends on how much time (i) on-SmartCore processing, (ii) SmartCore-to-Cloud data transmission, and (iii) on-Cloud processing take. For videos with the resolution of 1080p, the hybrid version of Amber Alert spends a significant amount of time for on-SmartCore processing (Step 1 from FIG. 4 and color detection), and therefore, it is slower than both SmartCore-based one (for which SmartCore-to-Cloud data transmission and on-Cloud processing times are zero) and Cloud-based one (for which on-SmartCore processing time is negligible). However, when the resolution of input videos is changed to 720p, the hybrid implementation outperformed the SmartCore-based one (FIG. 6). In this experimental scenario, for the hybrid implementation, on-SmartCore processing takes significantly less time (compared to when the resolution of the input video is 1080p) so that it is reasonable to shift several steps of the plate detection algorithm (Step 2 to Step 8 from FIG. 4) to the Cloud despite the additional time overhead associated with SmartCore-to-Cloud data transmissions.

Eventually, in order to examine how the performance of different implementations may vary with changes in computational power, in another experimental scenario, SmartCore's CPU is manually overclocked to run at 1200 MhZ and the examination is repeated using a subset of videos (with the resolution of 720p and frame rate of 1 FPS). FIG. 7 summarizes the results of this experiment. In this experimental scenario, where the computational power of SmartCore is significantly increased, SmartCore-based implementation outperformed both hybrid and Cloud-based implementations, indicating that the additional time needed for SmartCore-to-Cloud data transmissions and on-Cloud processing is greater than performing all steps (Steps 1-8 in FIG. 4) on SmartCore.

Using the real-world dataset, it is examined how much cellular data, on average, each implementation has used for processing the 10-minute videos in the dataset. For both Cloud-based and hybrid implementations, the data usage highly depends on both FPS (that specifies the data transmission frequency) and resolution of the video (that determines the size of each packet transmitted to the Cloud). Furthermore, for Hybrid implementation, the sparsity of the environment (e.g., how many vehicles are present in each video frame) has an effect on the cellular data usage: in crowded areas, the hybrid implementation of the application transmits more areas of interest to the Cloud. As shown in the table in FIG. 8, the Cloud-based implementation consumes the most cellular data among the three implementations, whereas the SmartCore-based one utilizes the least (i.e., it only transmits the vehicle's GPS coordinates to the Cloud upon the detection of an abductor's vehicle). Hybrid implementation offers 34.8× reduction in cellular data usage in comparison to the Cloud one, at the cost of performing a lightweight algorithm on SmartCore. SmartCore-based implementation only occasionally communicates with the Cloud (to receive the updated database of active Amber Alerts and send the location of the vehicle upon the detection of a suspicious vehicle). However, it imposes significant computational overhead on SmartCore by locally processing all images.

It is to be noted that the Cloud-based implementation, that can be also implemented using conventionally-proposed Cloud-based architectures, cannot be used in real-word scenarios due to its high cellular data usage. For example, if the user only drives for one hour every day, it requires transmitting over 20 GBs of data every month over cellular network (assuming the video is captured at frame rate=1 FPS and resolution=720p). This imposes a significant cost overhead on the user (currently, in the U.S., the cost is close to $100 per month for 20 GBs).

Transmitting raw images captured from the vehicle to third-party servers, can potentially leak significant private information, including, but not limited to, the specifications of the vehicle (e.g., make, color, and model), the area that the vehicle's owner is travelling through, and the owner's locations of interest or even their identity (e.g., their face may be captured in some video frames when the Amber Response is running while the vehicle is stopped and the user is walking in front of the camera). Performing in-vehicle image processing can minimize the need of transmitting the raw data to the external servers, minimizing the private information leakage. Among three implementations of Amber Response, from privacy perspective, the Cloud-based implementation is the worst, whereas the SmartCore-based has the minimum information leakage (it does not transmit the raw image at all and only shares the user's location when it detects a suspicious vehicle in the surroundings). The hybrid version, that only transmits plate areas and removes other objects in the environment from the image, also significantly enhances the privacy of the user (in comparison to the Cloud-based version). However, based on the empirical results, it might occasionally detect some other objects in the environment as plates and transmit some inessential images, that can be potentially processed to reveal the user's location (e.g., images of logos and flyers), along with images of interest (i.e., images that only contain plates of nearby vehicles).

Application 2: Insurance Monitor

Pay-as-you-drive insurance policies are envisioned as the future of auto insurance. Several insurance companies worldwide (for example, MetroMile) have already introduced new low-rate insurance plans for which they take traveling mileage, along with the driver's behaviors, into account. They currently collect the required information (for example, the vehicle's speed and odometer readings) from a dongle that directly connects to the vehicle. Moreover, they commonly gather other types of data from the OBD port, including various diagnostic messages. Despite potential benefits that insurance dongles have offered, their usage is currently limited due to privacy concerns and security threats.

A few solutions have been proposed to address the privacy/security issues associated with the use of insurance dongles. Such solutions commonly require a design change in the hardware (insurance dongle) or back-end infrastructures (insurance servers). They impose significant extra costs on companies due to at least one of the following reasons. First, insurance companies already have millions of active dongles in the market and changing the whole infrastructure (including dongles and servers) is very difficult (if not impossible). Second, to minimize design costs, they commonly use generic OBD dongles that are available from third-party companies. However, each new solution needs a specific dongle (i.e., a new type of dongles should be designed and developed for each proposed solution). Thus, insurance companies are unwilling to incorporate these solutions into their in-use scheme.

Based on ProCMotive, an application is designed and developed that enables security/privacy-friendly pay-as-you-drive insurance, while imposing no design change (and consequently, no additional cost) on insurance companies. On the user side, the proposed application utilizes the access control library offered by SmartCore to ensure that the dongle only performs its intended activities (for example, only queries the speed data), preventing security attacks and minimizing the privacy leakage. Moreover, it uses the port management library, along with data manipulation techniques, to remove inessential sensitive data from the raw data requested by the insurance dongle, while maintaining the similar utility.

Insurance Monitor aims to enhance the security of the vehicle and privacy of the user by addressing two well-known types of threats against Internet-connected vehicles enabled by the attachment of an insurance dongle: (i) the feasibility of tracking the vehicle based on the raw speed data collected from the OBD port (an attack against location privacy), and (ii) the possibility of taking control of an insurance dongle. It is assumed that the adversary is (i) an insurance company or a third-party who has access to the speed data collected by the insurance dongle and is interested in collecting private location information or (ii) an attacker that exploits the vulnerabilities of an insurance dongle to inject malicious commands to the vehicle.

The vehicle's location can be easily tracked by processing its speed data. A novel algorithm, referred to as Elastic Pathing, can extract location traces from raw speedometer data given an initial location (for example, the user's home address that is known to the insurance company). Applying this algorithm to real-world traces, it was shown that pay-as-you-drive policies, which rely on processing the speed data, are not privacy-preserving despite the claims of insurance companies. The leakage of private location information may expose the user to scams or unwanted advertisement. Furthermore, it may lead to several consequences, including the uncomfortable feeling of being monitored and actual physical harm.

Previous research studies have also shed light on one common security vulnerability of third-party dongles: dongles can be enforced (either remotely over the cellular network or within a short distance over Bluetooth connection) to send arbitrary messages to the OBD port with an arbitrary rate. This vulnerability can potentially provide a direct access to several vital components and systems in the vehicle, enabling the attacker to perform various life-threatening attacks, ranging from remotely controlling the braking system to launching DoS attacks against various built-in systems. For example, security vulnerabilities of an insurance dongle have been exploited to send arbitrary unauthorized messages to the OBD port. They constructed an end-to-end security attack, highlighting the potential seriousness of existing security flaws.

Insurance Monitor aims to address the threats emerged as a result of the widespread use of pay-as-you-drive insurance policies, which rely on aftermarket dongles.

Using the port management API, the proposed application first captures a packet from the insurance dongle and forwards it to the vehicle. It then gets the response from the vehicle and modifies its data field using a privacy-preserving function in such a way that the insurance company can still get a similar utility (e.g., can correctly compute the number of times the user has speeding violation). Eventually, it sends the modified response to the dongle. In general, different privacy-preserving functions can be used to minimize the information leakage, for example, data shuffling, noise addition, and rounding techniques are viable options. Using these techniques, in the prototype implementation of Insurance Monitor, three privacy-preserving algorithms have been implemented.

(1) Alg. 1: Shuffling: Given a window size W, this algorithms aggregates W speed samples ($V=\{V_i, \ldots, V_w\}$) and returns a random permutation of them ($V^*$).

(2) Alg. 2: Rounding and then shuffling: Given a windows size W, for each sample of the vehicle's speed $V_i$, this algorithm first rounds $V_i$ (to the nearest integer, nearest five, or nearest ten), then aggregates and shuffles W of them, and eventually returns the set $V^*$.

(3) Alg. 3: Noise addition: For each sample of the vehicle's speed $V_i$ this algorithm picks a float number $Z_i$ drawn from a uniform distribution with the range of $R_{uniform}$, i.e., $0<Z_i<R_{uniform}$, and returns $V_i^*=V_i+Z_i$.

Insurance Monitor ensures that (i) the dongle can transmit a set of expected requests (i.e., data request that are essential for pay-as-you-drive insurance) and (ii) the rate of requests generated by the dongle always remains below a reasonable threshold. This threshold can be predetermined by examination of an insurance dongle in a trusted environment (based on empirical results, for MetroMile dongle, this threshold can be set to one request per second). Upon the attachment of the insurance dongle, using the Android application developed to offer a user-friendly interface, the user can choose their insurance company. On SmartCore, the appropriate access control file, that specifies access control policies for the insurance dongle, will be automatically modified (using the access control API, which is accessible through the flask-based web server), and an upper bound will be set for the rate of requests (using the port management API).

Figure 9A:
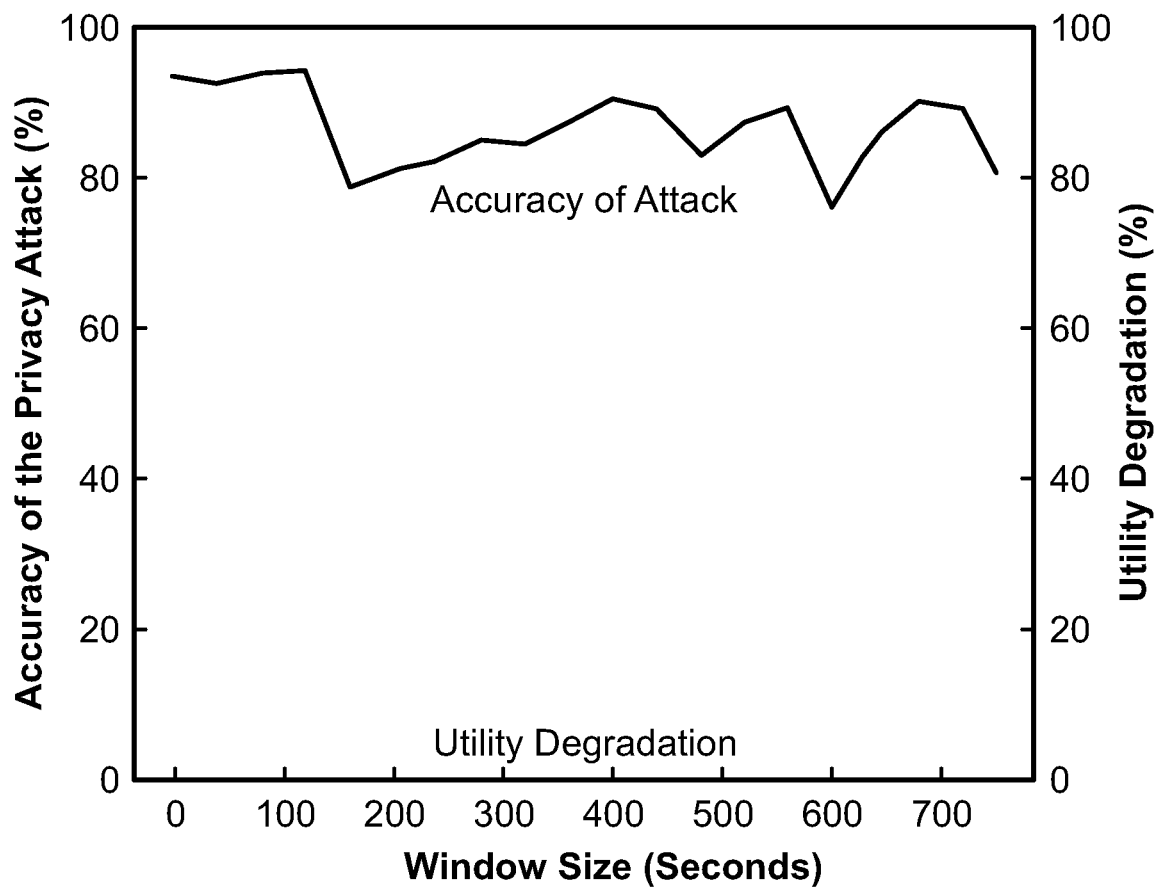
FIG. 9(a) is a graph demonstrating how window size affects utility and attack accuracy according to an embodiment of the present invention.
Figure 9B:
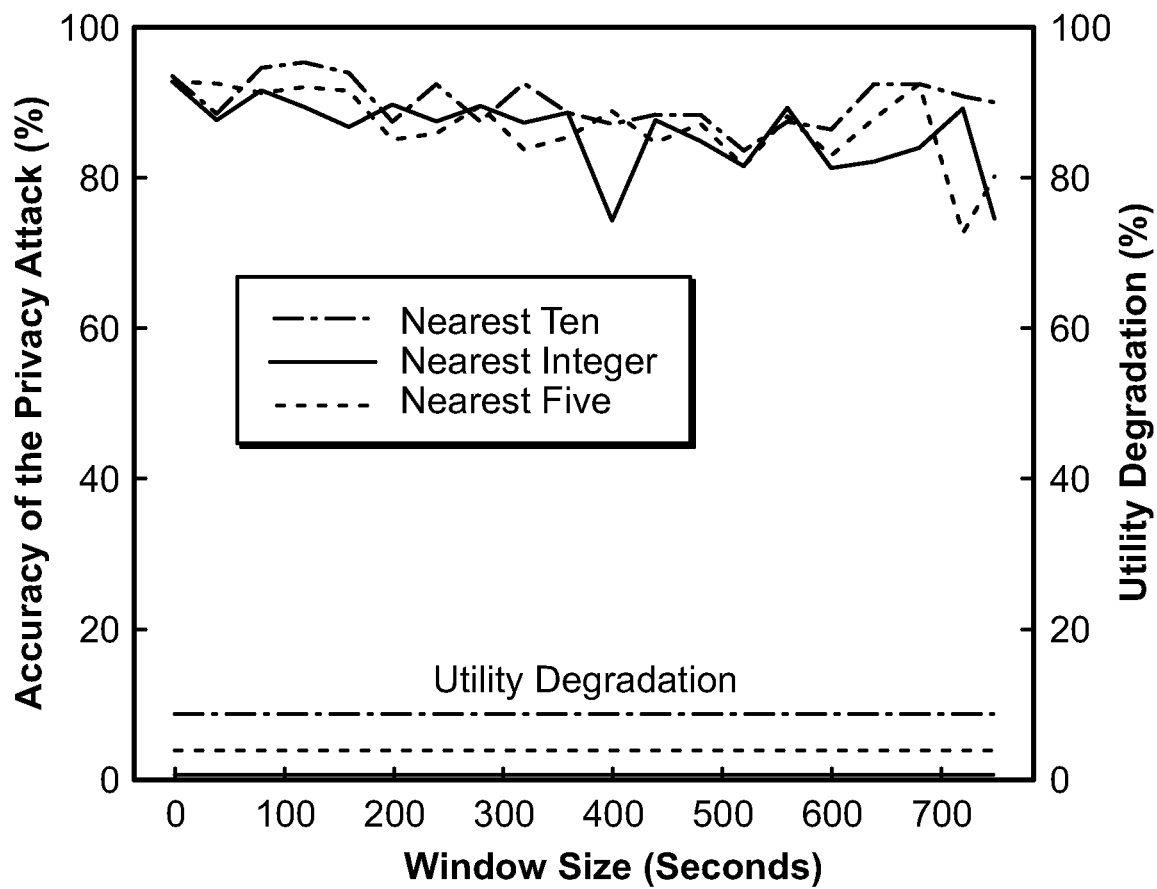
FIG. 9(b) is a graph demonstrating how window size and rounding precision affect utility and attack accuracy according to an embodiment of the present invention.
Figure 9C:
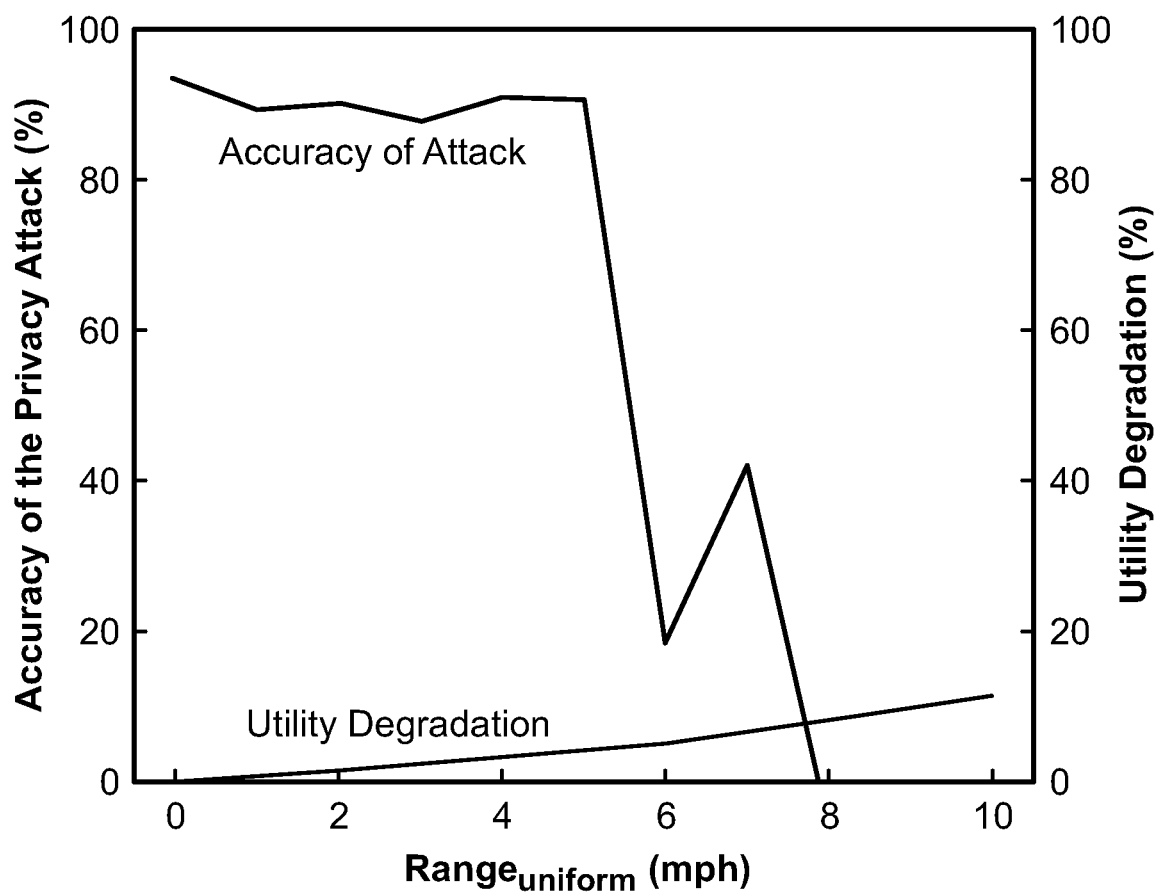
FIG. 9(c) is a graph demonstrating accuracy of attack and utility degradation with respect to a range of uniform distribution according to an embodiment of the present invention.

In order to examine how effectively the privacy-preserving algorithms utilized in Insurance Monitor address the Elastic Pathing attack, it was examined how the accuracy of the attack, i.e., the distance between the estimated destination and the actual destination divided by the actual traveled distance reduces, and a speed-related utility required for the pay-as-you-drive policy degrade when Insurance Monitor exploits each privacy-preserving algorithm. The speed-related utility is defined as the number of times that the speed is above a certain threshold. For the experiments, the speed threshold was set to 25 mph, i.e., it was assumed that the insurance company intends to know how many times the vehicle's speed exceeded 25 mph. In the experiments, to offer a fair analysis, the database that includes several streams of a vehicle's speed collected from real-world driving traces was utilized (Insurance Monitor performs privacy-preserving function on the pre-recorded raw data). It is desired that Insurance Monitor reduces the accuracy of the attack, while maintaining the utility. FIGS. 9(a)-(c) show both accuracy of the attack and utility degradation (i.e., the difference between computed utility based on the modified data and actual utility divided by the actual utility) for three algorithms discussed above. FIG. 9 (a) demonstrates how windows size W affects both utility and attack accuracy when Alg. 1 is used. FIG. 5(b) shows how both window size W and rounding precision affect the utility and attack accuracy when Alg. 2 is utilized. FIG. 5 (c) demonstrates the accuracy of attack and utility degradation with respect to the range of the uniform distribution for Alg. 3. Based on the experimental results, Algs. 1 and 2 slightly decrease the accuracy of the attack (or equivalently, enhance the user's privacy), whereas Alg. 3 can significantly reduce the accuracy of the attack with minimal utility degradation.

As discussed earlier, based on empirical results, it is assumed that a legitimate insurance dongle should be able to collect speed data from the vehicle every second, i.e., Insurance Monitor modifies its access file so that the file specifies that the dongle can only access speed data, and sets an upper bound of 1 on its rate of requests. A third-party dongle is connected to SmartCore and first programmed it to create 100 legitimate requests (querying speed data with the frequency of 1). In this setup, it is observed that SmartCore forwards all requests to the vehicle. The dongle is then reprogrammed twice in such ways that it violates the above-mentioned assumptions about the legitimate behavior of an insurance dongle: (i) the dongle makes 100 attempts to send illegitimate requests (querying other data than speed data), and (ii) sends 100 legitimate requests at a high frequency (ranging from 10 to 200 requests per second). It is observed that Insurance Monitor blocks all requests in both cases, preventing the attack against the vehicle. In the first case, CARWare simply drops the requests. However, in the second case, it still processes the requests, however, regulates their rate (CARWare puts legitimate requests in a queue and processes only one request per second). To sum up, Insurance Monitor prevents this attack by using two core libraries of CARWare, in particular, the access control and port management.

Summary and Highlights of Applications

The table in FIG. 10 highlights the advantages of ProCMotive for the two above-mentioned vehicular applications.

Comparing SmartCore-enabled (SmartCore-based and hybrid) implementations of Amber Response to its Cloud-based implementation (the baseline) demonstrates that they significantly reduce cellular data usage, enhance user privacy, and are more resilient against the potential unavailability of wireless connectivity, while they can provide promising performance results. As demonstrated earlier, although a powerful Cloud server was utilized (with 8 CPUs and 32 GBs of RAM), performance results provided by SmartCore-enabled implementations are comparable to the Cloud-based implementation for low frame rates. In particular, with video inputs captured at 1 FPS, the SmartCore-based version of Amber Response can accurately (with the accuracy of 100%) detect the abductor's vehicle even faster than Cloud-based version (as illustrated in FIG. 7). Furthermore, Insurance Monitor can provide several benefits for already-in-use pay-as-you-drive insurance policies (the baseline). In particular, it can prevent several security attacks and significantly enhance the privacy of the vehicle's owner, while maintaining the utility needed by insurance policies.

As shown in FIG. 1, in the proposed architecture, SmartCore (the proposed programmable add-on dongle) is envisioned to host a variety of vehicular applications. In the prototype, CARWare (the middleware specifically designed for vehicles) was developed that enables intended functionalities/features of SmartCore, which are essential for hosting third-party applications (access control, application management, and update management). In addition, libraries (data collection and port management) were developed that can facilitate, control, and regulate the interactions of third-party applications/dongles with the vehicle. In order to maximize the usability of the framework, developers are allowed to write their applications in the programming language of their choice. Here, a flask-based web server was implemented inside CARWare that provides a RESTFul API for accessing the functions of core libraries (independent of the underlying programming language, an application only needs to send HTTP/HTTPS request to the web server). Both proposed vehicular applications have been developed based on the core libraries accessible via the RESTFul API. Amber Response utilizes the data collection library, and Insurance Monitor uses the assess control and port management libraries. Using the trusted smartphone application, that has administrative privileges and is developed based on the application management, access control, and update management libraries, the user can easily manage both vehicular applications, modify their access level, and update them if needed.

In-vehicle data processing offered by SmartCore can be very beneficial to data-dominant applications. Both hybrid and SmartCore-based implementations of Amber Response significantly reduce cellular data usage (and the cost associated with transmitting the data over LTE network). Moreover, the use of SmartCore is suggested for the implementation of safety and security-related applications. To ensure safety and security, the core functions of Insurance Monitor (that aims to address security and privacy threats) were placed on SmartCore and did not utilize external resources offered by the user's personal devices or the Cloud. This ensures that the application remains available and reliable even if the vehicle-to-Cloud or vehicle-to-smartphone communication channel becomes unavailable. Depending on the desired response time, reliability requirements, and cost considerations, applications can be either fully or partially implemented on SmartCore. In particular, developers can be expected to place the core functions of mission-critical and safety-related vehicular applications (for example, security attack detection or collision prediction algorithms), that should remain available even in the absence of a vehicle-to-Cloud or vehicle-to-smartphone communication channel, on SmartCore.

SmartCore offers sufficient in-vehicle resources to support strong cryptography mechanisms (for example, Advanced Encryption Standard) needed for protecting wireless communications to/from the vehicle, limiting remote wireless attacks. Moreover, SmartCore protects the vehicle's OBD port and acts as a gateway for third-party dongles. Using the port management library, an application can monitor and regulate the behavior of other OBD-connected dongles to detect and block malicious activities initiated from them. Furthermore, the access control library enables the user to decide when, where, to what extent, and under what conditions, the user wants to share data with third-party applications or OBD-connected dongles. In addition, to improve the security of the vehicle, an application hosted on SmartCore can implement privacy-enhancing functions that manipulate the raw data before sharing it with third-party dongles or applications.

In the disclosed architecture, SmartCore brings additional computational/storage resources to the vehicle and offers short-range and long-range communication to transfer data/tasks to nearby devices (e.g., the user's personal devices) or the Cloud. Indeed, SmartCore can run such applications with partially (or even without) utilizing either the user's smartphone or the Cloud: Insurance Monitor and SmartCore-based implementation of Amber Response completely rely on in-vehicle resources offered by SmartCore. These enable the implementation of a variety of low-latency/real-time applications on SmartCore.

CONCLUSIONS

At least two types of applications that can be implemented based on ProCMotive: (i) user-centered applications that can directly benefit the user, e.g., enhance the security, safety, and performance of the vehicles, and (ii) data-oriented applications that are collecting and processing data from the vehicle's built-in sensors or add-on modules, such as, air quality sensors, cameras, and wearable and implantable medical devices connected to SmartCore. Some user-centered applications include but are not limited to sign detection, collision prediction/report, transmission assistance, and vehicle performance enhancement. Some data-oriented applications include but are not limited to empowering environmental monitoring, creating maps, smart advertisements, and surveillance.

Regarding sign detection, several research studies have proposed and evaluated different algorithms for sign detection and collision prediction. State-of-the-art algorithms offer a high accuracy in sign detection and early prediction of accidents, but require powerful computational/storage resources that are now missing in the majority of already-in-market vehicles. ProCMotive potentially enables developers to rely on additional in-vehicle resources offered by SmartCore and develop new safety-enhancing technologies for in-market vehicles. For example, an application hosted on SmartCore can use a vision-based sign detection algorithm to detect a stop sign and check if the vehicle's speed is above a safe threshold as the vehicle is moving toward the sign.

Regarding collision prediction/report, similar to the sign detection application described above, an application hosted on SmartCore, a vision-based collision detection algorithm can be implemented based on ProCMotive and informs the user about a possible accident a few seconds before the incident. A simple application can also detect utilize the sensory data provided by SmartCore to detect an accident and report it automatically to insurance companies or law enforcement agencies.

Regarding transmission assistance, an application can assist the driver of a vehicle with manual transmission to find the optimal time for changing the gear. Although automatic transmission enhances user convenience and driving experience, manual transmission usually offers a better acceleration, less weight, and less power loss than an automatic transmission if used correctly. To maximize the engine lifetime, vehicle manufacturers commonly suggest a number representing the optimal revolutions per minute (RPM) for changing the gear in the vehicle's manual. However, in practice, it is not straightforward for drivers to figure out what is the optimal RPM for enhancing the fuel efficiency or acceleration since it depends on several parameters, including the vehicle's specification (e.g., make, model, type), the age of the vehicle, and the driver's goal (i.e., whether the user wants to maximize the acceleration or minimize the fuel consumption). An application hosted on the SmartCore has access to several engine-related parameters, including, the current RPM, fuel consumption, and vehicle's speed. Such an application can utilize these parameters, along with the user's feedback, to find the optimal RPM for changing each gear (for example, the application can learn the optimal RPMs for minimizing fuel consumption over several days, and then provide active feedback, such as visual warnings, to let the user know when they should change the gear).

Regarding enhancing vehicle performance, the performance of the vehicle changes over the time as it gets older. An application hosted on SmartCore that has access to several built-in sensors of the vehicle can tune ignition parameters with respect to the make and model of the car, and weather/road condition.

Regarding empowering environmental monitoring, environmental monitoring, that utilizes environmental data and scientific principles to resolve environmental issues (for example, climate change, urban heat islands, and air pollution) has garnered ever-increasing attention in recent years. The increasing prevalence of sensors and wireless sensor networks (WSNs) has significantly revolutionized environmental monitoring. Despite numerous benefits that WSNs can provide, their scalability is very limited due to the cost associated with their design, deployment, and maintenance. To address the scalability issue of sensor-based systems in environmental monitoring, an application can be developed based on ProCMotive to collect different environment-related data from the vehicle's built-in sensors or add-on modules, partially/fully process them (e.g., compress the data, remove the inessential privacy-sensitive portions of the raw data, or train learning models) using in-vehicle or nearby resources, and send the results to the Cloud over the LTE network. Such an application can transform vehicles into very powerful cost-efficient contributors to environmental crowdsensing, tremendously empowering environmental monitoring. This is based on (i) already-in-market vehicles having numerous under-utilized sensors and (ii) their mobility and wide area of coverage making them promising contributors to crowdsensing (to carry additional sensors needed for crowdsensing and/or be used as crowd-sensors).

Regarding creating maps, high-quality maps (navigational maps, elevation maps, heat maps, map of potholes) of cities provide valuable information for different businesses and governmental agencies. An application hosted on Smart-Core, that can access GPS location, a variety of sensors (including, but not limited to, thermometer, speedometer, sensors used in suspension system, airbag sensors, LIDAR, and SONARs) and images from the environment can partially/fully process them can facilitate building maps based on crowdsourcing: the data from each vehicle can be aggregated on a server and interpreted to create a variety of maps.

Regarding smart advertisement, an application implemented based on ProCMotive can collect data for enhancing advertisements. A smart advertising object (e.g., a vehicle-mounted display mounted or a road-side billboard) can obtain (either directly or through a server that aggregates data of multiple vehicles) the data collected by an application hosted on ProCMotive to show an advertisement with respect to nearby vehicles' specifications (e.g., make and model).

Regarding surveillance, similar to the Amber Response, an application hosted on ProCMotive can provide real-time vision-based useful information for law enforcement agencies. For example, in the presence of an emergencies, they can access the cameras mounted on vehicles that that are close to the area of interest to remotely monitor the area.

Developing a customized vehicular application involves two main steps. A developer first uses the core libraries related to CARWare to interact with the vehicle and implement the algorithmic parts of the application. The developer then defines an access control file (the user confirms the access policies included in the file upon the installation of the application).

As demonstrated in FIG. 2, CARWare includes five core libraries. Core libraries enable several fundamental functionalities of the middleware (for example, the access control library has a private function, named contextRecognition( . . . ), that periodically detects the current contexts) and provide a set of public functions (for example, get-Data( . . . ) implemented in the data collection library enables collecting different types of sensory/non-sensory data).

The table in FIG. 11 summarizes key functionalities (public functions) of the core libraries that can be used in vehicular applications. Public functions are only accessible through the flask-based web server running inside CARWare. For example, a third-party application can query the vehicle's speed by sending the following request to the RESTFul API offered by CARWare: [{"appID": "<application Identifier>", "appToken": <Application Token>, "requestType": "dataCollection"}, {"source": "vehicle", "type": "vehicle_speed"}]. In this JSON array, the first element contains the application's credentials and indicates that the application wants to access the data collection library, and the second element specifies that the application queries the vehicle's speed. For all requests sent to the flask-based web server, the first element carries the application's or administrative credentials and specifies one of five core libraries, however, the other elements of the array vary from one request to another.

Developers may prefer to impose minimal computational/storage overhead on SmartCore and push several functions of an application to other resources (for example, in hybrid and Cloud-based implementation of Application 1: Amber Response several functions are placed on the Cloud). In this case, developers must build application for SmartCore that enables the interaction of the vehicle with outside resources. For example, for the Cloud-based version of (Amber Response), a simple application hosted on SmartCore interacts with CARWare to gather frames from the environment and forwards the collected frames to an external server hosted on the Cloud (the application simply uses the data collection library that is accessible via the server running in CARWare).

For each application, the developer needs to specify what core software components (for example, the data collection or access control library) the application uses, what type of sensory/non-sensory data (for example, the vehicle's speed, GPS coordinates, and VIN) it collects from the vehicle, what wireless communication module (e.g., LTE, WiFi, or BLE) it needs. The developer should initially build an access control file (in JSON format) that reflects the requested access level for the application.

Regarding vehicle isolation, SmartCore adds minimal energy consumption overhead to the vehicle's battery. In the prototype embodiment, SmartCore uses an internal battery (with the capacity of 50,000 mAh) that provides sufficient energy (when it is fully-charged) to main SmartCore operations for several days. When the vehicle is running, SmartCore's battery can be recharged via OBD port, which provides a direct access to the vehicle's battery that is charged by an electrical alternator. SmartCore can easily detect when the vehicle is off and enter a low-power mode as follows. It periodically queries the vehicle's RPM and examines if the RPM is equal to zero (or cannot be read). If so (the vehicle is not running), SmartCore immediately disconnects its battery from the vehicle's battery and informs all applications that it intends to pause them shortly. After isolating its internal battery, it waits for a predefined period of time to allow applications to enter a safe mode (if necessary) and then pauses all of them. Afterwards, it only checks the status of the vehicle on a regular basis (for example, every 30 seconds). Its internal battery can maintain this functionality for over 10 days. As soon as it detects the vehicle's engine is running, SmartCore resumes the paused services and activates an electrical relay to charge its internal battery through OBD (this relay disconnects the internal battery of SmartCore from the vehicle's battery when the vehicle is not running).

It is suggested to use an internal battery for SmartCore to ensure that running services, middleware, and underlying OS have sufficient time to enter a safe mode without imposing additional energy consumption overhead on the vehicle's battery. Furthermore, the above-mentioned procedure prevents battery draining attacks (i.e., an attack in which a service attempts to drain the vehicle's battery) since it automatically disconnects SmartCore from the vehicle's battery as soon as it detects the vehicle is not running and pauses applications shortly after.

Although the majority of conventional vehicular applications offer non-collaborative vehicular services (i.e., a service in which vehicles do not need to communicate with each other), sharing data between vehicles is beneficial for emerging vehicular applications. For example, it enables a braking assistant service to react with respect to another vehicle's movements even when it is obscured by other vehicles or objects. As another example, consider an application that aims to find localized security attacks against vehicles, e.g., a malicious road-side device that attempts to send deceitful wireless commands to the vehicle in an attempt to active its warning systems or a mechanic who performs illegitimate activities on the vehicle. Relying on collaborative reasoning can significantly benefit such an application: upon the occurrence of warning messages or non-regular events (in particular, rapid changes in the sensory readings and accessing OBD port), each vehicle can share different types of data (for example, sensory data collected by the vehicle or requests made by OBD dongles) with other vehicles, enabling them to reason about possible security attacks.

As shown in the reference architecture, SmartCore offers two types of wireless communication: short-range communication protocols (for example, BLE) and Internet connectivity over LTE. Short-range communication protocols enable a vehicle to communicate with nearby vehicles. In particular, BLE allows SmartCore to quickly transmit data (for example, a message can be encapsulated in an advertising packet that does not require any prior connection establishment) to vehicles within a 100-meter distance. Furthermore, BLE enables the vehicles to indirectly communicate to each other (through a smartphone application). Moreover, in the proposed architecture, Internet connectivity enables indirect vehicle-to-vehicle communications through Cloud servers, for example, a vehicle can upload its data, along with its GPS coordinates, to a sever hosted on the Cloud and the sever can share the vehicle's data with nearby vehicles.

SmartCore may contain some private information, such as, credit card information, and can be unplugged anytime by unauthorized user. It is essential that the device can authenticate the user (or equivalently his vehicle) before offering any services. Three authentication approaches are briefly described, along with their shortcomings.

Approach 1: VIN-based authentication: Each vehicle carries a VIN, a unique identification number that serves as the car's fingerprint. Indeed, no two vehicles in operation have the same VIN. In the initial setup of SmartCore, the user connects the dongle to the vehicle and sets a private password for the device, while SmartCore requests the VIN via OBD port. SmartCore then uses the VIN number to make sure that it is connected to the legitimate user's vehicle: it frequently (e.g., every 30 seconds) checks if SmartCore is still connected to the authorized vehicle. Upon the detection of a new VIN number, it stops all services and encrypts sensitive data and requests for the user's private password. Thus, if SmartCore is removed from one vehicle and attached to another vehicle without the user's permission, it will not remain fully functional. Although this approach can significantly limit the attacker, it alone does not offer a bulletproof secure solution for two main reasons. First, since VIN cannot be read from the OBD port when the vehicle is off, it does not enable detecting the detachment of device when the vehicle is off. Second, the attacker may still try to remove SmartCore from the vehicle and use an OBD simulator (i.e., a small device that replicates the OBD interface and implements vehicles' standard communication protocol) to provide a fake VIN to SmartCore. In this scenario, if the attacker knows the authorized vehicle's VIN (or finds the number by exhaustively searching all possibilities), they may be able to access private data stored on SmartCore.

Approach 2: Remote deactivation: Similar to the common approach used in smartphone industry, the security of SmartCore can benefit from remote deactivation that enables the user to remotely deactivate/format the device and report it as "stolen". On the Cloud, a database of reported devices is maintained, and SmartCore frequently asks the Cloud server if the authorized user marked their device as "stolen". This approach has one main limitation: the user cannot deactivate the device if it is completely disconnected from the Internet.

Approach 3: External authenticator: Each time SmartCore powers up, it can check the presence of an external authenticator device, for example, the user's smartphone. To impose minimal overhead on the user's device and minimize his involvement, SmartCore should first perform a one-time authentication based on the user's smartphone and then utilize Approach 1 to continuously authenticate the vehicle based on its VIN. As soon as SmartCore becomes unable to authenticate the user based on the VIN (the vehicle becomes off or the dongle is removed), SmartCore enters a secure mode in which it halts services, encrypts sensitive data, and frequently checks for the presence of the secondary authenticator device. A similar approach is using a Bluetooth or near-field communication (NFC) token hidden by the user in the vehicle that maintains identification credentials (shared with SmartCore at the initial setup). In this case, SmartCore can frequently check if it is located close to the token (e.g., in the vehicle). In this case, since it can periodically check the presence of the token without imposing any additional overhead on the user's personal devices, the VIN-based authentication approach may not be necessary.

In the prototype embodiment, a vehicular application is only allowed to send non-/minimally-controlling commands to the vehicles. Although sending controlling commands (i.e., commands that can directly affect the operations of internal subsystems in the vehicle, for example, lock doors) through OBD port is not impossible, the availability of such commands varies significantly from one vehicle to another (it is manufacturer-specific). Furthermore, sending commands, that are not supported in the standard of OBD protocol, requires packet spoofing (i.e., using identification credentials of an internal component to create packets that can deceive other internal components). Packet spoofing is neither recommended by vehicle manufacturers nor safe. Therefore, controlling commands are not included in the prototype embodiment. This limits the domain of vehicular applications, but offers a side benefit: in the event of a failure in the dongle (for example, an application or connection failure), the core functions of the vehicle remain intact and stable. If the OBD port fails or malfunctions (for example, it cannot power up SmartCore due to a fuse failure), it negatively affects the functionality of the SmartCore: the dongle may not be able to access the vehicle's internal battery (however, it can remain functional for a limited time since it has an internal battery), or several services can become unavailable due to the unavailability of the data being captured from the vehicle. In both above-mentioned scenarios (failure of the dongle or the OBD port), the safety and security of the vehicle becomes similar to when the vehicle does not have the dongle.

In some embodiments, developers may intend to ensure the full functionality of a set of mission-critical applications (in particular, security and safety-enhancing applications, such as collision prediction) even in the presence of a failure in SmartCore. Towards this end, a secondary dongle can be added to the reference architecture. The secondary dongle can offer less computational/storage resources and only host the small set of mission-critical services that should remain functional (at least for a short period of time until the driver can resolve the SmartCore's issue). This dongle can share the vehicle's OBD port with SmartCore and passively monitor SmartCore's behavior to detect its failure. Upon the detection of a failure in SmartCore, the secondary dongle can disconnect it from the vehicle and take its mission-critical responsibilities. However, if the OBD port fails, the functionality of the secondary dongle can also become very limited due to the unavailability of the needed data.

As such, disclosed herein is a reference architecture that can enable rapid development of various vehicular applications. The architecture is formed around a core component, called SmartCore, a privacy/security-friendly programmable dongle that offers in-vehicle computational and storage resources and hosts applications. Based on the reference architecture, an application development framework was developed for vehicles called ProCMotive. To highlight potential benefits that ProCMotive offers, two new vehicular applications were disclosed based on ProCMotive, namely, Amber Response and Insurance Monitor. These applications were evaluated using real-world data and compared with state-of-the-art technologies. ProCMotive enables application developers and researchers, who are interested in proposing and examining vehicular applications, to rapidly design, prototype, and evaluate novel applications for vehicles.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A system for vehicular application development comprising:
 a programmable on-board diagnostics (OBD)-connected dongle configured to be attached to a vehicle OBD port for providing computational and storage resources to the vehicle and hosting one or more applications in the vehicle;
 the dongle configured to utilize one or more external devices, cloud servers, and add-on modules to provide additional computational and storage resources for the applications and enable control of the applications;
 the dongle being implemented with a middleware that enables intended operations of the dongle, the middleware comprising:
  an update management module configured to enable updating of the applications and the middleware itself from an update stored on the cloud servers;
  a data collection module configured to enable access of at least one of sensory and non-sensory data from the vehicle and the one or more add-on modules;
  an application management module configured to enable user control of the applications via the one or more external devices;
  a port management module configured to enable control of the vehicle OBD port via the applications; and an access control module configured to enable one or more policies regarding access of the applications and the one or more add-on modules to the at least one of sensory and non-sensory data from the vehicle.

2. The system of claim 1, wherein the access control module comprises:
a policy enforcement subsystem configured to ensure the applications and the one or more add-on modules comply with at least one of predefined and user-defined policies;
a context recognition subsystem configured to continually detect a plurality of contexts to enable setting preferences with respect to these contexts; and
a policy management subsystem configured to enable policy preferences.

3. The system of claim 1, wherein the sensory data comprises one or more of coolant temperature, engine rotation per minute (RPM), ambient temperature, and air pressure, and the non-sensory data comprises one or more of global positioning system (GPS) coordinates, vehicle identification number, and make and model of the vehicle.

4. The system of claim 1, wherein the dongle is further configured to collect and process data for the applications and one or more third-party dongles.

5. The system of claim 1, wherein the add-on modules comprise input/output devices, the input/output devices comprising one or more of cameras, sensors, global positioning system (GPS) receivers, microphones, voice assistant systems, and computing/storage units.

6. The system of claim 1, wherein the dongle is further configured to communicate via at least one of short-range and long-range communication channels.

7. The system of claim 1, wherein the applications comprise one or more of an amber response application and an insurance monitor application.

8. The system of claim 1, wherein the applications comprise one or more of sign detection, collision detection, transmission assistance, vehicle performance enhancement, environmental crowdsensing, map creation, smart advertisements, and surveillance.

9. The system of claim 1, further comprising an authentication subsystem to protect private information based on one or more of vehicle identification number, remote deactivation, and external authentication.

10. A system for vehicular application development comprising:
a programmable on-board diagnostics (OBD)-connected dongle for providing computational and storage resources to a vehicle and hosting one or more applications in the vehicle;
the dongle configured to utilize one or more external devices, cloud servers, and add-on modules to provide additional computational and storage resources for the applications and enable control of the applications;
the dongle being implemented with a middleware that enables intended operations of the dongle, the middleware comprising:
an update management module configured to enable updating of the applications and the middleware itself;
a data collection module configured to enable access of at least one of sensory and non-sensory data from the vehicle;
an application management module configured to enable user control of the applications via the one or more external devices;
a port management module configured to enable control of the vehicle OBD port via the applications; and
an access control module configured to enable one or more policies regarding access of the applications to the at least one of sensory and non-sensory data from the vehicle.

11. The system of claim 10, wherein the access control module comprises:
a policy enforcement subsystem configured to ensure the applications and the one or more add-on modules comply with at least one of predefined and user-defined policies;
a context recognition subsystem configured to continually detect a plurality of contexts to enable setting preferences with respect to these contexts; and
a policy management subsystem configured to enable policy preferences.

12. The system of claim 10, wherein the sensory data comprises one or more of coolant temperature, engine rotation per minute (RPM), ambient temperature, and air pressure, and the non-sensory data comprises one or more of global positioning system (GPS) coordinates, vehicle identification number, and make and model of the vehicle.

13. The system of claim 10, wherein the dongle is further configured to collect and process data for the applications and one or more third-party dongles.

14. The system of claim 10, wherein the add-on modules comprise input/output devices, the input/output devices comprising one or more of cameras, sensors, global positioning system (GPS) receivers, microphones, voice assistant systems, and computing/storage units.

15. The system of claim 10, wherein the dongle is further configured to communicate via at least one of short-range and long-range communication channels.

16. The system of claim 10, wherein the applications comprise one or more of an amber response application and an insurance monitor application.

17. The system of claim 10, wherein the applications comprise one or more of sign detection, collision detection, transmission assistance, vehicle performance enhancement, environmental crowdsensing, map creation, smart advertisements, and surveillance.

18. The system of claim 10, further comprising an authentication subsystem to protect private information based on one or more of vehicle identification number, remote deactivation, and external authentication.

19. A method for vehicular application development comprising:
providing a programmable on-board diagnostics (OBD)-connected dongle for providing computational and storage resources to a vehicle and hosting one or more applications in the vehicle;
configuring the dongle to utilize one or more external devices, cloud servers, and add-on modules to provide additional computational and storage resources for the applications and enable control of the applications; and
implementing the dongle with a middleware that enables intended operations of the dongle, the middleware comprising:
an update management module configured to enable updating of the applications and the middleware itself;
a data collection module configured to enable access of at least one of sensory and non-sensory data from the vehicle;

an application management module configured to enable user control of the applications via the one or more external devices;

a port management module configured to enable control of the vehicle OBD port via the applications; and an access control module configured to enable one or more policies regarding access of the applications to the at least one of sensory and non-sensory data from the vehicle.

20. The method of claim 19, further comprising implementing the access control module with:

a policy enforcement subsystem configured to ensure the applications and the one or more add-on modules comply with at least one of predefined and user-defined policies;

a context recognition subsystem configured to continually detect a plurality of contexts to enable setting preferences with respect to these contexts; and a policy management subsystem configured to enable policy preferences.

* * * * *